(12) United States Patent
Harvie

(10) Patent No.: US 8,983,752 B2
(45) Date of Patent: Mar. 17, 2015

(54) SYSTEM AND METHOD FOR IDENTIFYING CHARACTERISTICS OF A VEHICLE

(75) Inventor: Richard Harvie, Glossop (GB)

(73) Assignee: Trimble Navigation Limited, Sunnyvale, CA (US)

( * ) Notice: Subject to any disclaimer, the term of this patent is extended or adjusted under 35 U.S.C. 154(b) by 610 days.

(21) Appl. No.: 13/214,867

(22) Filed: Aug. 22, 2011

(65) Prior Publication Data

US 2013/0054107 A1 Feb. 28, 2013

(51) Int. Cl.
*G06F 19/00* (2011.01)
*G01G 7/00* (2006.01)
*G01G 19/04* (2006.01)
*G01G 19/08* (2006.01)

(52) U.S. Cl.
CPC .................................. *G01G 19/086* (2013.01)
USPC .............................. 701/99; 702/173; 702/175

(58) Field of Classification Search
CPC ..... G01G 19/086; G01G 19/02; G01G 19/19; G01G 19/021; G01G 19/022; G01G 19/025; G01G 19/027; G01G 19/028; G01G 19/03; G01G 19/08; G01G 19/10
USPC ...................... 701/123, 124, 99; 702/173, 175
See application file for complete search history.

(56) References Cited

U.S. PATENT DOCUMENTS

| | | | |
|---|---|---|---|
| 5,549,364 A | 8/1996 | Mayr-Frohlich et al. | |
| 5,973,273 A | 10/1999 | Tal et al. | |
| 6,167,357 A * | 12/2000 | Zhu et al. | 702/175 |
| 6,314,383 B1 * | 11/2001 | Leimbach et al. | 702/173 |
| 6,584,391 B2 | 6/2003 | Lack | |
| 7,013,207 B2 | 3/2006 | Majstorovic et al. | |
| 7,039,519 B2 * | 5/2006 | Ishiguro et al. | 701/124 |
| 7,818,140 B2 * | 10/2010 | Dreier et al. | 702/173 |
| 7,966,115 B2 * | 6/2011 | Bellinger | 701/55 |
| 8,116,925 B2 | 2/2012 | Wang et al. | |
| 8,571,748 B2 | 10/2013 | Kluge et al. | |
| 2003/0017911 A1 * | 1/2003 | Lack | 477/115 |
| 2010/0217464 A1 * | 8/2010 | Wang et al. | 701/22 |
| 2011/0040438 A1 * | 2/2011 | Kluge et al. | 701/29 |

FOREIGN PATENT DOCUMENTS

FI WO2006136648 * 12/2006 ............. G01G 19/08
WO WO-03/044471 5/2003

* cited by examiner

*Primary Examiner* — Thomas G Black
*Assistant Examiner* — Tyler Paige

(57) ABSTRACT

A system for calculating a first mass value indicative of a first mass of a vehicle is provided, wherein the vehicle has a vehicle interface capable of providing fuel data indicative of a rate at which fuel is being consumed by an engine of the vehicle at each point in time. The system includes: an interface coupled with the vehicle interface, the interface configured for: receiving the fuel data; and receiving movement data indicative of a movement of the vehicle at the each point in time; and a data processing system configured for: deriving a plurality of mass values from the fuel data and the movement data, each mass value corresponding to a respective point in time; and calculating, using the plurality of mass values, the first mass value indicative of the first mass of the vehicle.

42 Claims, 6 Drawing Sheets

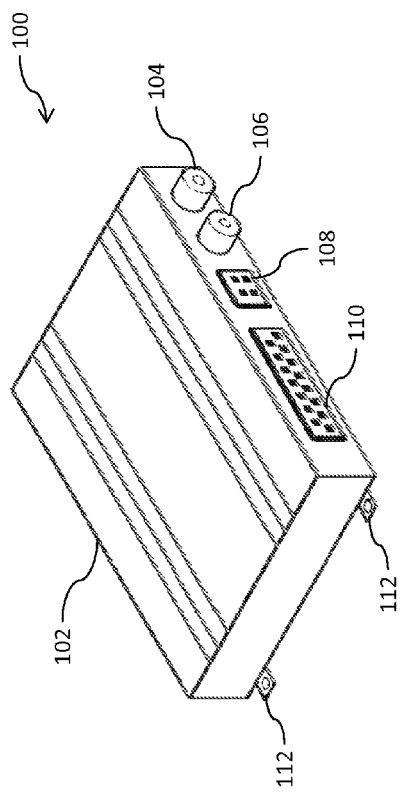
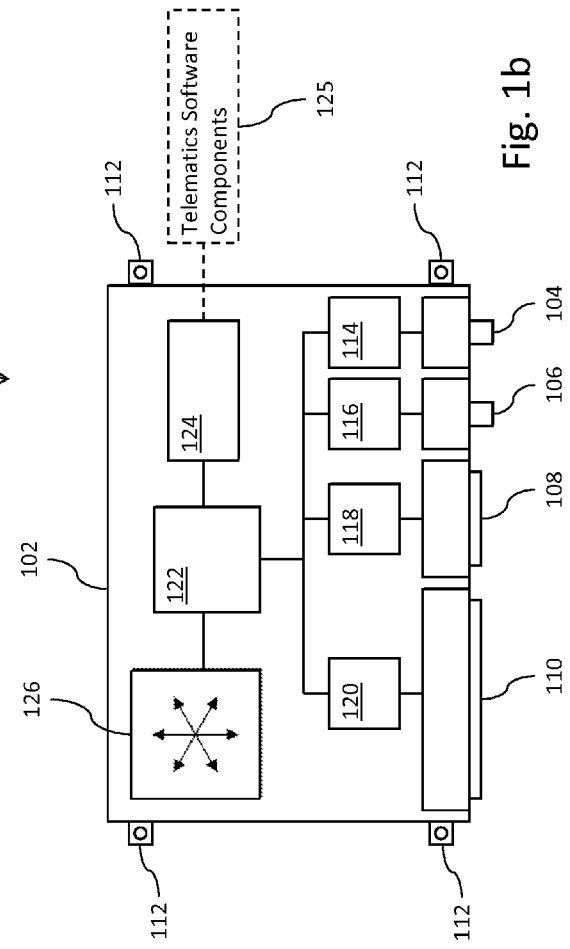

SYSTEM AND METHOD FOR IDENTIFYING CHARACTERISTICS OF A VEHICLE

FIELD

Embodiments of the present technology relate to systems and methods for identifying characteristics of a vehicle, and more particularly for identifying characteristics of a vehicle using data indicative of the movement of the vehicle. Particular embodiments relate to methods and systems for calculating the mass of a load being carried by a vehicle.

BACKGROUND

Telematics units are known and may be used to track and monitor vehicles such as cars, motorcycles, vans and trucks. The telematics unit is mounted in the vehicle and gathers information about the status of the vehicle. The telematics unit may then store the information for later retrieval, and/or report the information to a remote monitoring station using a mobile communications network.

An exemplary telematics unit may contain a Global Positioning System (GPS) unit, an accelerometer, a connection to a vehicle network (such as a Controller-Area Network or CAN) and a connection to a user interface. The GPS unit provides speed and position data, the accelerometer provides data indicating the acceleration of the vehicle (typically in three dimensions), the connection to the vehicle network provides a means for obtaining engine status, speed and fault data from the electronic control units (ECUs) of the vehicle, and the user interface enables interaction with the driver of the vehicle. The telematics unit can also contain a mobile communications transceiver which communicates with a controlling station and may send data to and receive data from the controlling station.

In general vehicles will carry loads of varying mass. The mass (or equivalently weight) of the load of the vehicle will affect the total mass of the vehicle—the total mass being derived from the sum of the unloaded or "kerb" weight of the vehicle and the weight of the load of the vehicle (it will be understood that in the context of this document, mass and weight may be used interchangeably). This is particularly evident in goods vehicles, where the variable mass of a load may be significantly greater than the kerb weight of the vehicle; however, even in passenger vehicles, such as cars, busses and coaches, the mass of the load may account for a significant fraction (>20%) of the total mass.

Accurate knowledge of the mass of a vehicle (or equivalently the mass of the load of the vehicle) is important for a number of reasons. These include (but are not limited to):

a. being able to efficiently route a vehicle to take into account weight restrictions (on e.g. bridges), and to find the most fuel efficient route (an unladen vehicle may be more efficient over a shorter route with large inclines, while an equivalent vehicle carrying a heavy load may be more efficient over a longer but flatter route);

b. being able to account for vehicle weight/mass when determining driver efficiency—companies employing professional drivers (i.e. haulage companies) often compare the fuel consumed by drivers so as to promote fuel efficient driving; since the fuel consumption of a vehicle increases as the weight of the vehicle increases, a measure of vehicle weight is important to enable accurate comparisons between drivers;

c. being able to estimate the wear on a vehicle. A heavy load will increase the amount of wear on a vehicle, therefore by recording the weight of the vehicle, a more accurate estimate of wear can be made, and therefore the service intervals of the vehicle can be properly assessed.

One known method of measuring the weight of a vehicle is to use a "weighbridge" of "truck-scale" which is, in effect, a large set of scales which weighs the whole vehicle. The problems with using a weighbridge are the cost of the equipment, and that it is not practical to weigh a vehicle often, since the vehicle needs to travel to the weighbridge to be weighed.

Other methods of measuring vehicle weight involve measuring the downward force on the wheels. This may be done by measuring the displacement of the suspension, or changes in tyre pressure. The problem with such systems is that it requires additional equipment (i.e. the sensors) to be installed in the vehicle, adding to the cost and complexity of the system.

BRIEF DESCRIPTION OF THE DRAWINGS

A telematics system will now be described as an embodiment of the present invention, by way of example only, with reference to the accompanying figures in which:

FIG. 1A is a perspective view of a telematics unit as may be used in an embodiment;

FIG. 1B is a schematic diagram showing components of the telematics unit of FIG. 1, in accordance with an embodiment;

Several parts and components of these embodiments of the present technology appear in more than one Figure; for the sake of clarity the same reference numeral will be used to refer to the same part and component in all of the Figures.

SUMMARY

Figure 1C:
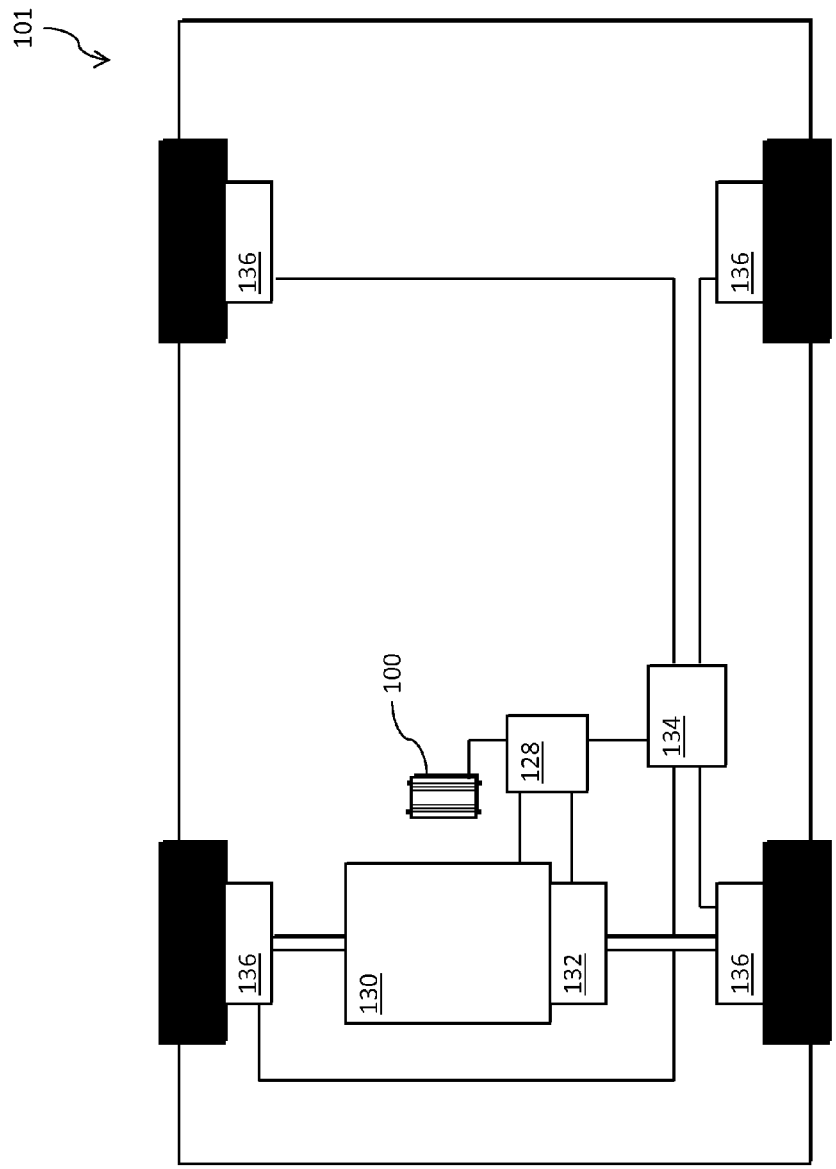
FIG. 1C is a cross section plan view of a vehicle in which the telematics unit described in relation to FIGS. 1a and 1b can be mounted and used, in accordance with an embodiment.

In accordance with at least one embodiment of the present technology, methods, devices, systems and software are provided for supporting or implementing functionality to calculate a value indicative of a mass of a load being carried by a vehicle, as specified in the independent claims.

This is achieved by a combination of features recited in each independent claim. Accordingly, dependent claims prescribe further detailed implementations of the present technology.

According to a first aspect, there is provided a system for calculating a value indicative of a mass of a vehicle, the vehicle having a vehicle interface capable of providing fuel data indicative of a rate at which fuel is being consumed by an engine of the vehicle at each of a plurality of points in time, the system comprising: an interface arranged to be connected to the vehicle interface for receiving the fuel data, the interface further arranged to receive movement data indicative of the movement of the vehicle at each of the plurality of points in time; and a data processing system, wherein the data processing system is arranged to: derive a plurality of mass values from the fuel data and the movement data, each mass value corresponding to a respective the point in time; and calculate, using the plurality of mass values, a value indicative of a mass of the vehicle.

By deriving mass values from the fuel data and movement data, the system described above is able to calculate a value indicative of a mass of the vehicle without requiring additional hardware (such as a weighbridge or special sensors on the suspension of the vehicle). By contrast, the fuel data and movement data are already readily available to existing telematics units having OBD connections, accelerometers and/or GPS units (and therefore there is no requirement for additional hardware). Nevertheless, it has been found that the mass values will likely have a significant variation about the true mass value. Consequently, by calculating a plurality of such mass values, and then calculating a value indicative of a mass of the vehicle using the plurality of mass values, the system is able to derive an accurate value since the errors or noise in the individual values will largely cancel out.

The system may comprise a memory, and the data processing system may be arranged to: retrieve a value indicative of a mass of the vehicle when the vehicle is unloaded; and calculate a value indicative of the mass of a load being carried by the vehicle by subtracting the value indicative of a mass of the vehicle when the vehicle is unloaded from the value indicative of the mass of the vehicle.

While the kerb weight (i.e. the mass of an unloaded vehicle) will remain relatively constant, the load of the vehicle may vary substantially. In addition to calculating a value indicative of the mass of the vehicle, the system is also able to calculate a value indicative of the mass of the load of the vehicle, this being the variable mass with regards to the vehicle.

The data processing system may be arranged to identify, using the fuel data and the movement data, a subset of the data, and to calculate the value indicative of a mass of the vehicle using the mass values which correspond to the subset of data.

The data processing system may be arranged to identify the subset to include points in time other than those corresponding to one or more of the following: the vehicle changing gear; an acceleration of the vehicle being above a threshold; an acceleration of the vehicle being below a threshold; a velocity of the vehicle being above a threshold; a velocity of the vehicle being below a threshold; a rotational speed of the engine being above a threshold; and a rotational speed of the engine being below a threshold.

For certain points in time it may be impossible to calculate a mass value (such as when either the acceleration or the velocity of the vehicle are zero), or the conditions a given point in time may be such that a mass value, if calculated, would contain a large error. Some of these conditions are identified above. For example, if the speed of the vehicle is below a threshold there are likely to be large errors due, for example, to the clutch being slipped; in addition, if the speed of the vehicle is above a threshold the high level of aerodynamic drag (which becomes a dominant factor) may induce errors in the calculation. Alternatively, if the acceleration of the vehicle is above a threshold the engine is likely to be substantially less efficient since in high acceleration situations proportionally more fuel is consumed by the engine; equally if the acceleration of the vehicle is below zero or a threshold near to zero the vehicle may be braking which would cause errors in the calculated mass values. If the vehicle is changing gears then the engine is not connected to the wheels and therefore fuel may be consumed by the engine without accelerating the vehicle and therefore the mass calculation may produce an error. Finally the efficiency of the engine will likely decrease at high and low rotational speeds (i.e. RPM), therefore points in time at which the rotational of the engine is above a threshold or below a threshold may be excluded.

At least some of the movement data may be received from the vehicle interface.

By receiving the movement data from the vehicle interface, the system can be simplified since the movement data is received from the same source as the fuel data. In addition, the response time for movement data from a vehicle interface is relatively fast, since the vehicle interface is reporting data measured directly from a rotating shaft of the vehicle (typically either the gearbox output shaft, as measured and reported by the gearbox ECU connected to the vehicle network; or one or more wheels, as measured and reported by the ABS ECU connected to the vehicle network).

The interface may be arranged to be connected to a GPS unit, and at least some of the movement data is received from the GPS unit.

Most telematics units are already fitted with a GPS unit, or are arranged to be connected to a GPS unit. Consequently, velocity data is readily available from the GPS unit without further configuration of the system.

The movement data may comprise velocity data indicative of a velocity of the vehicle and acceleration data indicative of the acceleration of the vehicle.

By receiving velocity data, the system is able to estimate the resistances to the movement of the vehicle (i.e. aerodynamic drag and rolling resistance) since these are functions of vehicle velocity. In addition the energy/power available to accelerate the vehicle may be determined from the fuel data and the velocity data (from which estimates of the resistances to the movement of the vehicle can be made). The power available to accelerate the vehicle is a function of the mass of the vehicle and the acceleration of the vehicle. Consequently the acceleration data may be used to derive the mass values.

The interface may be arranged to be connected to an accelerometer mounted to the vehicle, and the acceleration data is received from the accelerometer.

One advantage of receiving acceleration data from the accelerometer is that it takes into account the vehicle ascending and descending a slope (and the associated changes in the load on the engine which result). To expand on this, when a vehicle descends a slope, the potential energy lost as it descends has the effect of accelerating the vehicle and/or reducing the load on the engine. The opposite effect occurs when the vehicle ascends the slope. In addition, during an ascent or descent, the longitudinal axis of the vehicle will point along the slope (i.e. at an angle to the horizontal); as a consequence, the accelerometer data will reflect this change in pitch of the vehicle (through the change in the angle of gravity). By contrast, acceleration data calculated from a change in velocity of the vehicle does not reflect a slope, and therefore errors may be introduced into the mass values.

The movement data may comprise velocity data indicative of a velocity of the vehicle and the data processing system may be arranged to calculate acceleration data indicative of the acceleration of the vehicle using the velocity data.

In some cases acceleration data from an accelerometer is not available. For example, the system may be simplified to exclude an accelerometer. Nevertheless, the system may still calculate mass values using acceleration data calculated from the changes in the vehicle speed. Unlike the data from an accelerometer, acceleration data calculated from changes in velocity will not reflect the angle of incline of a slope. Nevertheless, filters may be used to smooth the data (since over the long term the inclines and declines will average out).

The data processing system may be arranged, for each the point in time, to: calculate a first value indicative of the power produced by the engine using the fuel data; calculate a second value indicative of the power required to overcome resistance to movement of the vehicle using the velocity data; calculate a third value indicative of the change in energy of the vehicle by subtracting the second value from the first value; and derive a the mass value corresponding to the point in time using the third value and the velocity data and acceleration data.

To effectively calculate a mass value for a point in time, the system calculates a third value indicative in the change in energy of the vehicle. This third value is indicative of the power from the engine which is accelerating the vehicle; that is, it is the difference between the power produced by the engine, and the power required to overcome resistance to movement of the vehicle (i.e. drag and rolling resistance). The power available to accelerate the vehicle, the mass of the vehicle, and the acceleration and velocity of the vehicle are all linked (in that power equals mass times velocity times acceleration), therefore from this third value it is possible to derive a mass value indicative of the mass of the vehicle.

The data processing system may be arranged to derive one or both of: a drag value indicative of a power required to overcome aerodynamic drag of the vehicle; and a rolling resistance value indicative of a power required to overcome rolling resistance of the vehicle, whereby to calculate the second value.

The two most significant sources of resistance to movement for a vehicle (assuming it is travelling along a horizontal road and not up an incline) are aerodynamic drag and rolling resistance. Therefore, by deriving values for one or both of these the system is able to make a calculation of the power required to overcome resistance to movement of the vehicle.

The interface may be arranged to receive data indicative of the speed of rotation of the engine of the vehicle, and the data processing system may be arranged to: derive, using the data indicative of the speed of rotation of the engine, an engine loss value indicative of a power loss within the engine, whereby to calculate the second value.

A further source of resistance to the movement of the vehicle is the losses in the engine and gearbox which are related to the rotational speed of the engine (i.e. they are of an effectively constant amount per revolution). Therefore, by calculating an engine loss value a more accurate mass value can be calculated.

The data processing system may be arranged to derive a fuel rate value indicative of the rate at which fuel is being consumed by the engine from the fuel data, and to multiply the fuel rate value by an energy conversion value indicative of the efficiency of energy conversion from fuel to rotational power in the engine, whereby to calculate the first value.

To obtain an accurate mass value, the system must work out the useable power provided by the engine. The power input into the engine can be worked out by the rate at which fuel is consumed by the engine, and the energy content of the fuel. However, due to the nature of a thermodynamic engine, the useful power output is significantly less than the power input (in the form of the fuel). Consequently, to arrive at an accurate mass value the system multiplies the fuel data by an energy conversion value to calculate the useful power output of the engine.

The data processing system may be arranged to calculate the energy conversion value using one or more of: a speed of rotation of the engine; the magnitude of the second value; the velocity data; the acceleration data; the fuel rate data; one or more predetermined constants.

The energy conversion value may be a constant, typically in the range of 15% to 30%; however the conversion value may alternatively be a function of other factors, such as the speed of rotation of the engine, the speed of the vehicle, and the fuel rate itself.

The system may comprise a memory, and the data processing system may be arranged to retrieve one or more predetermined constants from the memory whereby to derive the mass value.

The one or more predetermined constants may be selected based on characteristics of the vehicle.

The predetermined constants may be indicative of characteristics of the vehicle, such as the factors affecting aerodynamic drag and rolling resistance, as well as the efficiency of the engine. The predetermined constants may be stored in a memory in the system to be retrieved as required. In some embodiments the memory may contain multiple sets of predetermined constants and depending on e.g. the make and model of the vehicle, one set may be selected to be used. Alternatively the constants may be input directly into the system, after, for example, being looked up in a table of values. The constants may be derived and/or stored remotely and transmitted to the system to be stored in the memory.

According to a second aspect, there is provided a telematics unit arranged to calculate a value indicative of a mass of a vehicle, the vehicle having a vehicle interface capable of providing fuel data indicative of a rate at which fuel is being consumed by an engine of the vehicle at each of a plurality of points in time, the telematics unit comprising: an interface arranged to be connected to the vehicle interface for receiving the fuel data, the interface further arranged to receive movement data indicative of the movement of the vehicle at each of the plurality of points in time; and a data processing system, wherein the data processing system is arranged to: derive a plurality of mass values from the fuel data and the movement data, each mass value corresponding to a respective the point in time; and calculate, using the plurality of mass values, a value indicative of a mass of the vehicle.

According to a third aspect, there is provided a method for calculating a value indicative of a mass of a vehicle, the vehicle having a vehicle interface capable of providing fuel data indicative of a rate at which fuel is being consumed by an engine of the vehicle at each of a plurality of points in time, the method comprising: receiving the fuel data from the vehicle interface; receiving movement data indicative of the movement of the vehicle at each of the plurality of points in time; deriving a plurality of mass values from the fuel data and the movement data, each mass value corresponding to a respective the point in time; and calculating, using the plurality of mass values, a value indicative of a mass of the vehicle.

The method may comprise retrieving a value indicative of a mass of the vehicle when the vehicle is unloaded; and calculating a value indicative of the mass of a load being carried by the vehicle by subtracting the value indicative of a mass of the vehicle when the vehicle is unloaded from the value indicative of the mass of the vehicle.

The method may comprise identifying, using the fuel data and the movement data, a subset of the data, and calculating the value indicative of a mass of the vehicle using the mass values which correspond to the subset of data.

The method may comprise identifying the subset to include points in time other than those corresponding to one or more of the following: the vehicle changing gear; an acceleration of the vehicle being above a threshold; an acceleration of the vehicle being below a threshold; a velocity of the vehicle being above a threshold; a velocity of the vehicle being below a threshold; a rotational speed of the engine being above a threshold; and a rotational speed of the engine being below a threshold.

The method may comprise receiving at least some of the movement data from the vehicle interface.

The method may comprise receiving at least some of the movement data from a GPS unit.

The movement data may comprise velocity data indicative of a velocity of the vehicle and acceleration data indicative of the acceleration of the vehicle.

The method may comprise receiving the acceleration data from an accelerometer mounted to the vehicle.

The movement data may comprise velocity data indicative of a velocity of the vehicle and the method may comprise calculating acceleration data indicative of the acceleration of the vehicle using the velocity data.

The method may comprise, for each the point in time: calculating a first value indicative of the power produced by the engine using the fuel data; calculating a second value indicative of the power required to overcome resistance to movement of the vehicle using the velocity data; calculating a third value indicative of the change in energy of the vehicle by subtracting the second value from the first value; and deriving a the mass value corresponding to the point in time using the third value and the velocity data and acceleration data.

The method may comprise deriving one or both of: a drag value indicative of a power required to overcome aerodynamic drag of the vehicle; and a rolling resistance value indicative of a power required to overcome rolling resistance of the vehicle, whereby to calculate the second value.

The method may comprise receiving data indicative of a speed of rotation of the engine of the vehicle; and deriving, using the received data indicative of the speed of rotation of the engine, an engine loss value indicative of a power loss within the engine, whereby to calculate the second value.

The method may comprise deriving a fuel rate value indicative of the rate at which fuel is being consumed by the engine from the fuel data, and multiplying the fuel rate value by an energy conversion value indicative of the efficiency of energy conversion from fuel to rotational power in the engine, whereby to calculate the first value.

The method may comprise calculating the energy conversion value using one or more of: a speed of rotation of the engine; the magnitude of the second value; the velocity data; the acceleration data; the fuel rate data; one or more predetermined constants.

The method may comprise retrieving one or more predetermined constants from a memory whereby to derive the mass value.

The method may comprise selecting the one or more predetermined constants based on characteristics of the vehicle.

According to a fourth aspect, there is provided a computer readable storage medium storing computer readable instructions thereon for execution on a computing system to implement a method for calculating a value indicative of a mass of a vehicle, the vehicle having a vehicle interface capable of providing fuel data indicative of a rate at which fuel is being consumed by an engine of the vehicle at each of a plurality of points in time, the method comprising: receiving the fuel data from the vehicle interface; receiving movement data indicative of the movement of the vehicle at each of the plurality of points in time; deriving a plurality of mass values from the fuel data and the movement data, each mass value corresponding to a respective the point in time; and calculating, using the plurality of mass values, a value indicative of a mass of the vehicle.

According to a fifth aspect, there is provided a system for estimating the fuel consumption of an engine of a vehicle, the system comprising: an interface arranged receive movement data indicative of the movement of the vehicle at a plurality of points in time; and a data processing system, wherein the data processing system is arranged, for each the point in time, to: derive, using the movement data, a first value indicative of the power required to overcome resistance to the movement of the vehicle; derive, using the movement data, a second value indicative of the change in energy of the vehicle; and calculate, using the first and second values, a third value indicative of the power produced by the engine; and the data processing system is further arranged to: estimate the fuel consumption of the vehicle based on the plurality of third values.

In some cases a telematics system is unable to receive data on the fuel consumption of the vehicle. This may be because the system does not have a connection to the vehicle's network, or because the vehicle does not provide fuel data on its vehicle network. Advantageously, the system described above is able to determine an estimate of the fuel consumption of the vehicle using data on the movement of the vehicle (such as velocity and speed data). This fuel consumption estimate may then be reported to a controlling station to plan a fuel stop in a vehicles schedule or to determine the fuel efficiency of the vehicle driver's driving.

The vehicle may have a vehicle interface capable of providing at least some of the movement data, and the interface may be arranged to be connected to the vehicle interface whereby to receive the at least some of the movement data.

The interface may be arranged to be connected to a GPS unit, and at least some of the movement data is received from the GPS unit.

The movement data may comprise velocity data indicative of the velocity of the vehicle and acceleration data indicative of the acceleration of the vehicle.

The interface may be arranged to be connected to an accelerometer mounted to the vehicle, and the acceleration data is received from the accelerometer.

The movement data may comprise velocity data indicative of a velocity of the vehicle and the data processing system may be arranged to calculate acceleration data indicative of the acceleration of the vehicle using the velocity data.

The data processing system may be arranged to derive one or both of: a drag value indicative of a power required to overcome aerodynamic drag of the vehicle; and a rolling resistance value indicative of a power required to overcome rolling resistance of the vehicle, whereby to calculate the first value.

The interface may be arranged to receive data indicative of the speed of rotation of the engine of the vehicle, and the data processing system may be arranged to: derive, using the data indicative of the speed of rotation of the engine, an engine loss value indicative of a power loss within the engine whereby to calculate the first value.

The data processing system may be arranged to estimate the fuel consumption using an energy conversion value indicative of the efficiency of energy conversion from fuel to rotational power in the engine.

The data processing system may be arranged to calculate the energy conversion value using one or more of: the movement data; a speed of rotation of the engine; the magnitude of the first value; the magnitude of the second value; one or more predetermined constants.

The system may comprise a memory, and the data processing system may be arranged to retrieve one or more predetermined constants from the memory whereby to estimate the fuel consumption.

The one or more predetermined constants may be selected based on characteristics of the vehicle.

According to a sixth aspect, there is provided a telematics unit configured to estimate the fuel consumption of an engine of a vehicle, the telematics unit comprising: an interface arranged receive movement data indicative of the movement of the vehicle at a plurality of points in time; and a data processing system, wherein the data processing system is arranged, for each the point in time, to: derive, using the movement data, a first value indicative of the power required to overcome resistance to the movement of the vehicle; derive, using the movement data, a second value indicative of the change in energy of the vehicle; and calculate, using the first and second values, a third value indicative of the power produced by the engine; and the data processing system is further arranged to: estimate the fuel consumption of the vehicle based on the plurality of third values.

According to a seventh aspect, there is provided a method for estimating the fuel consumption of an engine of a vehicle, the method comprising: receiving movement data indicative of the movement of the vehicle at a plurality of points in time; deriving, using the movement data, a first value indicative of the power required to overcome resistance to the movement of the vehicle for each the point in time; deriving, using the movement data, a second value indicative of the change in energy of the vehicle at each the point in time; calculating, using the first and second values, a third value indicative of the power produced by the engine for each the point in time; and estimating the fuel consumption of the vehicle based on the plurality of third values.

The method may comprise receiving the at least some of the movement data from a vehicle interface, the vehicle interface being capable of providing at least some of the movement data.

The method may comprise receiving at least some of the movement data from a GPS unit.

The movement data may comprise velocity data indicative of the velocity of the vehicle and acceleration data indicative of the acceleration of the vehicle.

The method may comprise receiving the acceleration data from an accelerometer mounted to the vehicle.

The movement data may comprise velocity data indicative of a velocity of the vehicle and the method may comprise calculating acceleration data indicative of the acceleration of the vehicle using the velocity data.

The method may comprise deriving one or both of: a drag value indicative of a power required to overcome aerodynamic drag of the vehicle; and a rolling resistance value indicative of a power required to overcome rolling resistance of the vehicle, whereby to calculate the first value.

The method may comprise receiving data indicative of the speed of rotation of the engine of the vehicle; and deriving, using the data indicative of the speed of rotation of the engine, an engine loss value indicative of a power loss within the engine whereby to calculate the first value.

The method may comprise estimating the fuel consumption using an energy conversion value indicative of the efficiency of energy conversion from fuel to rotational power in the engine.

The method may comprise calculating the energy conversion value using one or more of: the movement data; a speed of rotation of the engine; the magnitude of the first value; the magnitude of the second value; one or more predetermined constants.

The method may comprise retrieving one or more predetermined constants from a memory whereby to estimate the fuel consumption.

The method may comprise selecting the one or more predetermined constants based on characteristics of the vehicle.

According to an eighth aspect, there is provided a computer readable storage medium storing computer readable instructions thereon for execution on a computing system to implement a method for estimating the fuel consumption of an engine of a vehicle, the method comprising: receiving movement data indicative of the movement of the vehicle at a plurality of points in time; deriving, using the movement data, a first value indicative of the power required to overcome resistance to the movement of the vehicle for each the point in time; deriving, using the movement data, a second value indicative of the change in energy of the vehicle at each the point in time; calculating, using the first and second values, a third value indicative of the power produced by the engine for each the point in time; and estimating the fuel consumption of the vehicle based on the plurality of third values.

DESCRIPTION OF EMBODIMENTS

FIG. 1A shows a perspective view of a telematics unit 100 according to an embodiment. The telematics unit 100 has a case 102, on the side of which are a number of GPS antenna connectors 104, 106, 108 and 110.

Of these connectors, a GPS antenna connector 104 and a mobile communications antenna connector 106 enable the telematics unit 100 to be connected to external antennae. Consequently the telematics unit 100 can be mounted in a position in the vehicle, for example in the engine bay, where normally such antenna would be ineffective due to the quantity of metal blocking the signal. The connected antennae may then be mounted in the vehicle in a position where the signal strength is sufficient for effective operation.

User interface connector 108 (also a GPS antenna connector) is provided to connect the telematics unit 100 to a user interface unit (not shown). The user interface unit can be mounted in the cab of the vehicle, and be used, for example, to allow a driver of the vehicle to provide data to the telematics unit 100 and for the telematics unit 100 to provide notifications to the driver.

An On Board Diagnostics (OBD) connector 110 (also one of the GPS antenna connectors) is provided to connect the telematics unit 100 to an OBD connector on the vehicle. The OBD connector provides access to an in vehicle network, such as a CAN bus. The elements of an in vehicle network are described in more detail with reference to FIG. 1C.

In addition, the telematics unit 100 has a number of mounting points 112 (two shown) to enable it to be mounted within the vehicle.

FIG. 1B shows a plan view of the telematics unit 100 showing a schematic diagram of the circuitry inside. In line with FIG. 1A, the telematics unit 100 has a case 102, GPS antenna connectors 104, 106, 108 and 110, and mounting points 112.

Within the telematics unit, the GPS antenna connector 104 is connected to GPS circuitry 114. The GPS circuitry 114 receives GPS signals from a GPS antenna (not shown) via the GPS antenna connector 104 and provides the telematics unit with a GPS derived position. The nature of GPS circuitry 114 is known in the art and will not be described in detail.

Similarly mobile communications circuitry 116 is connected to the mobile communications antenna connector 106 (one of the GPS antenna connectors). The mobile communications circuitry 116 sends and receives signals via a mobile communications antenna (not shown) via the mobile communications antenna connector 106 and thereby provides the telematics unit with the ability to communicate with a controlling station over a mobile communications network. The mobile communications circuitry 116 is also known in the art will not be described in further detail.

Each of the user interface connector 108 and the OBD connector 110 are connected to respective driver circuitry 118 and 120. The driver circuitry 118 and 120 both operate in accordance with known principles to enable the telematics unit 100 to communicate with the user interface device and vehicle network as required. In addition, the OBD standard specifies that two pins of the OBD connector provide ground and battery voltage. Therefore the OBD connector may provide power to the telematics unit. Alternatively, power may be provided by a dedicated connection (not shown).

Within the telematics unit 100 is an accelerometer capable of providing data indicative of the acceleration of the unit (and consequently the vehicle it is mounted in). Typically the accelerometer is a three axis accelerometer, capable of providing an acceleration vector indicative of direction and magnitude of the acceleration of the vehicle in three dimensions; however, the accelerometer may alternatively provide acceleration along one or two axes. It will be understood that the vector data provided by the accelerometer will be in the frame of reference of the accelerometer, and may not necessarily be aligned with the axes of the vehicle. Consequently, the telematics unit and/or the accelerometer may be arranged to rotate the vector data so that it is aligned with the axes of the vehicle. It will be assumed henceforth that the accelerometer data contains, at the very least, an indication of the acceleration of the vehicle along its longitudinal (front to back) axis.

All of the GPS circuitry 114, mobile communications circuitry 116, driver circuitry 118 and 120 and accelerometer 126 are connected to a processor 122. The processor in turn is connected to a memory 124. The memory 124 contains telematics software components 125 stored thereon. The processor 122 and memory 124 are arranged such that the processor retrieves the telematics software components 125 from the memory 124 in accordance with known principles and executes the programming instructions encoded within the telematics software components 125 so as to operate in accordance with known principles, as well as performing the methods according to embodiments which are described in more detail below.

FIG. 1C shows a simplified plan view of a cross section through a vehicle 101 in which a telematics unit 100 in accordance with an embodiment has been mounted. The units within the vehicle (including the telematics unit) are schematic and are to be taken solely as an example of the units which may be present in a vehicle.

The telematics unit 100 is mounted to the vehicle 101 and is connected to an on-board diagnostics system 128 via the OBD connector 110. This on-board diagnostics system comprises an in vehicle network of interconnected electronic control units (ECUs). Each ECU may send and receive data on the in vehicle network. This on-board diagnostics system 128 collects this data from the in-vehicle network and makes it available to the telematics unit 100. The telematics unit 100 may request the data from the on-board diagnostics system 128; this may be done periodically, for example every second (although other periods are possible, for example multiple times a second, or at 5 or 10 second intervals).

The on-board diagnostics system 128 is connected to, amongst other things, the engine ECU 130, gearbox ECU 132 and anti-lock brake system (ABS) ECU 134. Each of these ECUs may provide the on-board diagnostics system 128 with data relating to the operation of the vehicle. Most of the data provided by these units is unrelated to the embodiments described herein and will not be described in detail. However, the data of relevance include: information relating to the rotational speed of the engine and of the fuel consumed in the engine provided by the engine ECU 130, information relating to the rotational speed of the gearbox output shaft provided by the gearbox ECU 132, and information relating to the rotational speed of the wheels provided by the ABS ECU 134.

Information regarding the fuel consumption of the engine is provided by the fuel injection control system, and indicates the amount of fuel consumed by the engine in any given period (for example each second). The amount of fuel is normally measured in millilitres (ml), but may also be measured in other units, such as grams (g) of fuel.

Either or both of the gearbox ECU 132 and the ABS ECU 134 may measure and provide data indicating the rotational speed of a shaft or axle of the vehicle, and thereby provide data indicative of the speed of the vehicle. The gearbox ECU 132 may measure the rotational speed of the output shaft of the gearbox to derive a measure of the speed of the vehicle. The ABS ECU 134 is connected to each wheel's brake system 136 and may use the rotational speed of one or all of the wheels of the vehicle to derive a measure of the speed of the vehicle.

In operation, the engine ECU 130, gearbox ECU 132 and ABS ECU 134 provide their respective data (including the above mentioned data indicating the rotational speed of a shaft or axle of the vehicle and the rate of fuel consumption of the engine) to the on-board diagnostics system 128. Some or all of this data is made available to the telematics unit 100 through the OBD connector 110 where it is received by the processor 122.

The accelerometer 126 measures the acceleration of the vehicle and passes the associated accelerometer data to the processor 122. The processor 122 may also receive GPS data from the GPS circuitry 114. The processor may store some or all of this data in memory 124.

Collectively the data received by the telematics unit from the ECUs, GPS and the accelerometer will be referred to as fuel data (information on the fuel consumption of the vehicle) and movement data (information on the velocity and acceleration of the vehicle). The received data may in addition include information on the speed of rotation of the engine.

Under control of the telematics software components 125, as described below, the processor 122 uses the fuel data and movement data to calculate a value indicative of a mass of the vehicle 101 and/or the mass of a load being carried by the vehicle 101. This data may then be stored in memory 124 or transmitted via wireless/cellular interface 116 to a control system.

To aid understanding of embodiments, the relationship between the mass of the vehicle and movement data received by the processor 122 of the telematics unit 100 will now be described.

In the example below, the fuel data and movement data are received by the telematics unit 100 at each of a plurality of time points. Each of these time points will be indexed by a subscript t, so that the data has the following symbols:

a. $v_t$ for data indicative of the velocity of the vehicle at time t (this velocity data may be received from any of the gearbox ECU 132, ABS ECU 134 of GPS circuitry 114);

b. $a_t$ for data indicative of the longitudinal (i.e. front to back) acceleration of the vehicle at time t as provided by the accelerometer 126);

c. $F_t$ for data indicative of the rate of consumption of fuel by the vehicle at the time t;

d. $f_t$ for data indicative of the rotational speed of the engine at a time t.

It will be understood that the index t may be any appropriate index; however it will be assumed henceforth that t is a simple numeric series, and consequently t+1 and t−1 simply indicate the next and previous time points.

It is possible to define a vehicle 'system', in which conservation of energy applies. This system has the following components (each of which will be described in more detail below):

a. The useful power output by the engine;
b. The change per unit time in the potential energy of the vehicle;
c. The change per unit time in the kinetic energy of the vehicle;
d. The power required to overcome aerodynamic drag;
e. The power required to overcome rolling resistance;
f. The power required to overcome rotational losses in the engine.

The useful power output by the engine is the power available to perform rotational work in the 'system'. Due to the unavoidable losses in a thermodynamic engine, the power output by the engine is not equivalent to the energy present in the fuel which is injected into the engine; however the useful power output may be calculated from the fuel rate. The useful power output may be expressed as $A_F F_t$ where $F_t$ is the fuel rate in ml s$^{-1}$ at time point t and $A_F$ is an energy conversion factor calculated from the efficiency of the engine and the energy content of the fuel.

The change per unit time in the potential energy of the vehicle indicates the changes in energy due to the vehicle ascending and descending a slope. This component can be calculated as $m \cdot g \cdot u_t$, where m is the mass of the vehicle, g is the acceleration due to gravity ($\approx 9.81$ m s$^{-2}$) and $u_t$ is the vertical velocity of the vehicle at time t. This value can be combined with the change in the kinetic energy, as will be described below.

The change per unit time in the kinetic energy of the vehicle is related to the changes in the velocity of the vehicle. This component can be calculated as $m \cdot v_t \cdot \dot{v}_t$, where m is the mass of the vehicle, $v_t$ is the longitudinal velocity of the vehicle and $\dot{v}_t$ is the change per unit time in the longitudinal velocity of the vehicle. As above, $v_t$ and $\dot{v}_t$ are indexed by t.

The overall change in the energy of the vehicle (i.e. change in kinetic energy plus the change in potential energy) may be expressed as $m \cdot g \cdot u_t + m \cdot v_t \cdot \dot{v}_t$. When the vehicle is ascending or descending a slope of angle θ, $u_t = v_t \sin θ$. Consequently the total change in energy of the vehicle equals $m \cdot v_t (g \sin θ + \dot{v}_t)$. Since the accelerometer measures the overall acceleration of the vehicle (which is equal to $g \sin θ + \dot{v}_t$), this expression can therefore be simplified to be $m \cdot g \cdot a_t$ where $a_t$ is the acceleration measured by the accelerometer.

The power required to overcome aerodynamic drag can be calculated using Rayleigh's drag equation as $$\frac{1}{2} \rho C_D A v_t^3,$$

where ρ is the mass density of air, $C_D$ is the drag coefficient of the vehicle, A is the cross sectional area of the vehicle and $v_t$ is the velocity of the vehicle. This expression can be simplified as $A_D v_t^3$, where $A_D$ is a drag factor $$\left(\text{equal to } \frac{1}{2} \rho C_D A\right).$$

The power required to overcome rolling resistance may be calculated from $C_{rr} mgv_t$ where $C_{rr}$ is the coefficient of rolling resistance, m is the mass of the vehicle, g is the acceleration due to gravity ($\approx 9.81$ m s$^{-2}$) and $v_t$ is the longitudinal velocity of the vehicle. This expression can be simplified as $A_R v_t$.

Finally, the power required to overcome rotational losses in the engine is typically related to the speed of rotation of the engine (distinct from the speed of rotation of the wheels, which relates to the rolling resistance). This power factor may be incorporated into the equation for the efficiency of the engine, or may be kept separate as here. Typically the power lost in the engine is proportional to the speed of rotation of the engine, and can therefore be expressed as $A_E \cdot f_t$, where $A_E$ is a constant factor (in J per rotation) and $f_t$ is the rotational speed of the engine (in s$^{-1}$ or Hz).

Overall, the above components give an energy conservation equation as follows:

$$A_F F_t = ma_t v_t + A_{v_t}^3{}_D + A_R v_t + A_E f_t \quad \text{(Equation 1)}$$

Equation 1 may be rearranged to give the equation for the mass of the vehicle as:

$$m_t = (A_F F_t 31 A_D v_t^3 - A_R v_t - A_E f_t)/a_t v_t \quad \text{(Equation 2)}$$

In equation 2, the mass has been provided with the index t, since it is now dependent on the variables at the time t. It will be apparent that as the variables change, the calculated mass value will vary.

To be able to use Equation 2 to calculate a value for the mass of the vehicle, values need to be given to the factors, $A_F$, $A_D$, $A_R$ and $A_E$. It will be understood that different vehicles will have different characteristics, and therefore the factors will be different for each vehicle. For the purposes of this example, the factors will be assumed to have a constant value, and that the values for the vehicle have been previously provided to the telematics unit 100 and stored in the memory 124.

The factors may be provided to the telematics unit 100 in a number of ways, which will be apparent to the person skilled in the art. For example, the factors, may be directly programmed into the telematics unit 100 when the unit is installed into a vehicle; may be provided by a user using a user interface connected to the user interface connection 108 and stored in the memory 124; or may be received from a server using the wireless connection provided through the mobile communications antenna connector 106. The values may be associated with other data, such as data identifying the make and model of the vehicle, and therefore may be selected according to such identifying data. Other methods of providing the factors will be readily apparent.

As an alternative, (as discussed in more detail below) it is possible that the factors are functions of other variables, and may themselves vary. It is also possible for the telematics unit 100 to refine the factors based on received data.

In the example below, the engine of the vehicle is assumed to be a diesel engine, and the factors are assumed to be constant and are calculated as follows:

a. $A_F$ is calculated from the energy density of diesel fuel (38.6 kJ per ml) and an efficiency coefficient of 25%. Therefore, the energy conversion factor $A_F$ will be taken to be 38.6×0.25=9.65 kJ ml$^{-1}$.

As stated above, the drag factor $A_D$ is equal to $$\frac{1}{2} \rho C_D A.$$

It will be assumed for this example that p has a value of 1.25 kg m$^{-3}$ (approximate value at 10° C.), $C_D A$ has a value of 0.64 m$^2$ (typical value for a car). Therefore $A_D$=0.4 kg m$^{-1}$.

$A_R$ can be calculated from the coefficient of rolling resistance and the force of the vehicle on the road (i.e. the normal force). A typical car tyre has a rolling resistance of 0.012, and a weight of 14000 N, giving $A_R$ a value of 168 N.

Finally, $A_E$ can be approximated as 2 J per revolution of the engine.

The use of Equation 2, and the factors described above, to calculate a value indicative of the mass of the vehicle according to an embodiment (and hence the mass of the load being carried by the vehicle) will now be described with reference to data recorded by a telematics unit mounted in a vehicle. This data is presented in the following table. Each row corresponds to a period of one second.

TABLE 1 telematics data

| Time (t) | Eng RPM ($f_r \times 60$) | Fuel Rate ($F_r$) | Velocity ($V_r$) | Accl ($a_r$) |
|---|---|---|---|---|
| 08:27:26 | 948 | 0.17 | 5.64 | 1.78 |
| 08:27:27 | 951 | 0.17 | 4.99 | 0.60 |
| 08:27:28 | 904 | 0.16 | 4.39 | −0.14 |
| 08:27:29 | 1530 | 1.30 | 4.40 | −1.36 |
| 08:27:30 | 1537 | 1.61 | 5.55 | −0.62 |
| 08:27:31 | 1832 | 1.16 | 6.94 | −0.48 |
| 08:27:32 | 2012 | 0.73 | 8.13 | 0.24 |
| 08:27:33 | 2045 | 0.52 | 8.71 | −0.09 |
| 08:27:34 | 2069 | 0.96 | 9.59 | −1.11 |
| 08:27:35 | 2343 | 1.70 | 9.55 | −0.18 |
| 08:27:36 | 2244 | 0.26 | 10.55 | 0.45 |
| 08:27:37 | 1060 | 0.11 | 11.08 | 0.68 |

The columns of data are as follows:
Time—the time at which the row of data was recorded;
Eng RPM—the speed of rotation of the engine, in revolutions per minute (RPM) and therefore equal to $f_r \times 60$;
Fuel Rate—the quantity of fuel injected into the engine in the one second period, measured in millilitres per second (ml s$^{-1}$);
Velocity—the longitudinal velocity (i.e. speed) of the vehicle in metres per second (m s$^{-1}$);
Accl—the acceleration in metres per second squared (m s$^{-2}$) of the vehicle along the longitudinal (front to back) axis of the vehicle as measured by the accelerometer.

The data above shows a brief (12 second) period in which the vehicle is gently accelerating. It will be apparent that a typical journey will have significantly more rows of data, for example, and assuming a sampling cycle of 1 second, a one hour journey will generate 3600 rows of data at one row per second.

Table 2 below shows the same recorded data as table 1, but with an additional column in which a mass value is calculated for each row using Equation 2.

TABLE 2 telematics data showing calculated mass values

| Time (t) | Eng RPM ($f_r \times 60$) | Fuel Rate ($F_r$) | Velocity ($V_r$) | Accl ($a_r$) | Mass ($m_r$) |
|---|---|---|---|---|---|
| 08:27:26 | 948 | 0.17 | 5.64 | 1.78 | 4.69 |
| 08:27:27 | 951 | 0.17 | 4.99 | 0.60 | −93.89 |
| 08:27:28 | 904 | 0.16 | 4.39 | −0.14 | 759.08 |
| 08:27:29 | 1530 | 1.30 | 4.40 | −1.36 | 1905.74 |
| 08:27:30 | 1537 | 1.61 | 5.55 | −0.62 | 4019.51 |
| 08:27:31 | 1832 | 1.16 | 6.94 | −0.48 | 2605.10 |
| 08:27:32 | 2012 | 0.73 | 8.13 | 0.24 | −1721.06 |
| 08:27:33 | 2045 | 0.52 | 8.71 | −0.09 | 1040.15 |
| 08:27:34 | 2069 | 0.96 | 9.59 | −1.11 | 376.98 |
| 08:27:35 | 2343 | 1.70 | 9.55 | −0.18 | 6466.84 |
| 08:27:36 | 2244 | 0.26 | 10.55 | 0.45 | 867.26 |
| 08:27:37 | 1060 | 0.11 | 11.08 | 0.68 | 834.66 |

It is apparent from the data above that there is a large variation in the calculated mass values in each row (varying from an apparently negative mass of −1721 kg to a high mass value of 6466 kg). This large variation is cause by a number of factors, including: varying lags in the system (for example, the fuel rate may be reported with a relative lag when compared to the acceleration); noise in the system (for example vibrations in the vehicle produce errors in the accelerometer data); changing gears (i.e. when the engine is not connected to the wheels for a period, causing the fuel rate to become unconnected with the speed of the vehicle); and braking (i.e. when the energy is being extracted from the closed system described above, therefore conservation of energy does not apply).

Consequently there is the problem of identifying an accurate mass value from the data received from the telematics unit. Nevertheless, the inventor has recognized that while there may be substantial errors in any one mass value, a large number of mass values may be analyzed as a group to derive an accurate measure of the vehicle mass.

Figure 2:
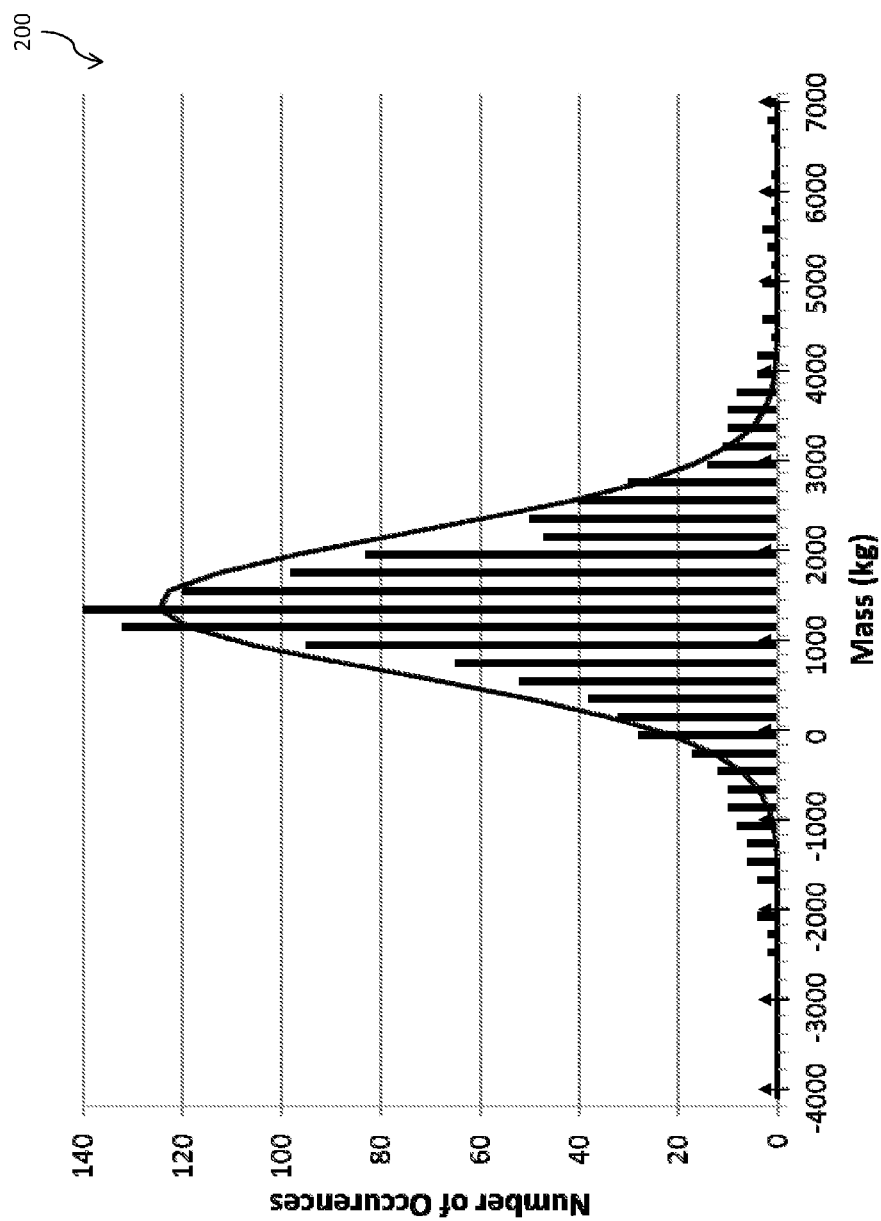
FIG. 2 is a plot showing the distribution of mass values calculated in accordance with an embodiment.

FIG. 2 shows a plot 200 of the distribution of calculated mass values ($m_r$) for a larger set of data (having approximately 1200 rows). The horizontal axis a number of ranges for the calculated mass, each range having a width of 200 kg; thus the column marked 0 represents the rows having mass values in the range of ±100, and the column marked 2000 represents the range 1900 to 2100. For clarity not all sections are labelled. The vertical axis represents the number of occurrences of mass values ($m_r$) within a given range.

The vertical columns represent the number of rows in the recorded data having a mass in the marked range. The overlaid black line shows an idealized Gaussian curve centred around 1400 kg. It can therefore be seen that while any individual row cannot be expected to give an accurate mass value, a set of values ($m_r$), obtained over a period of time, can be analyzed to give an accurate, overall, mass value (henceforth referred to a $l_r$).

Figure 3:
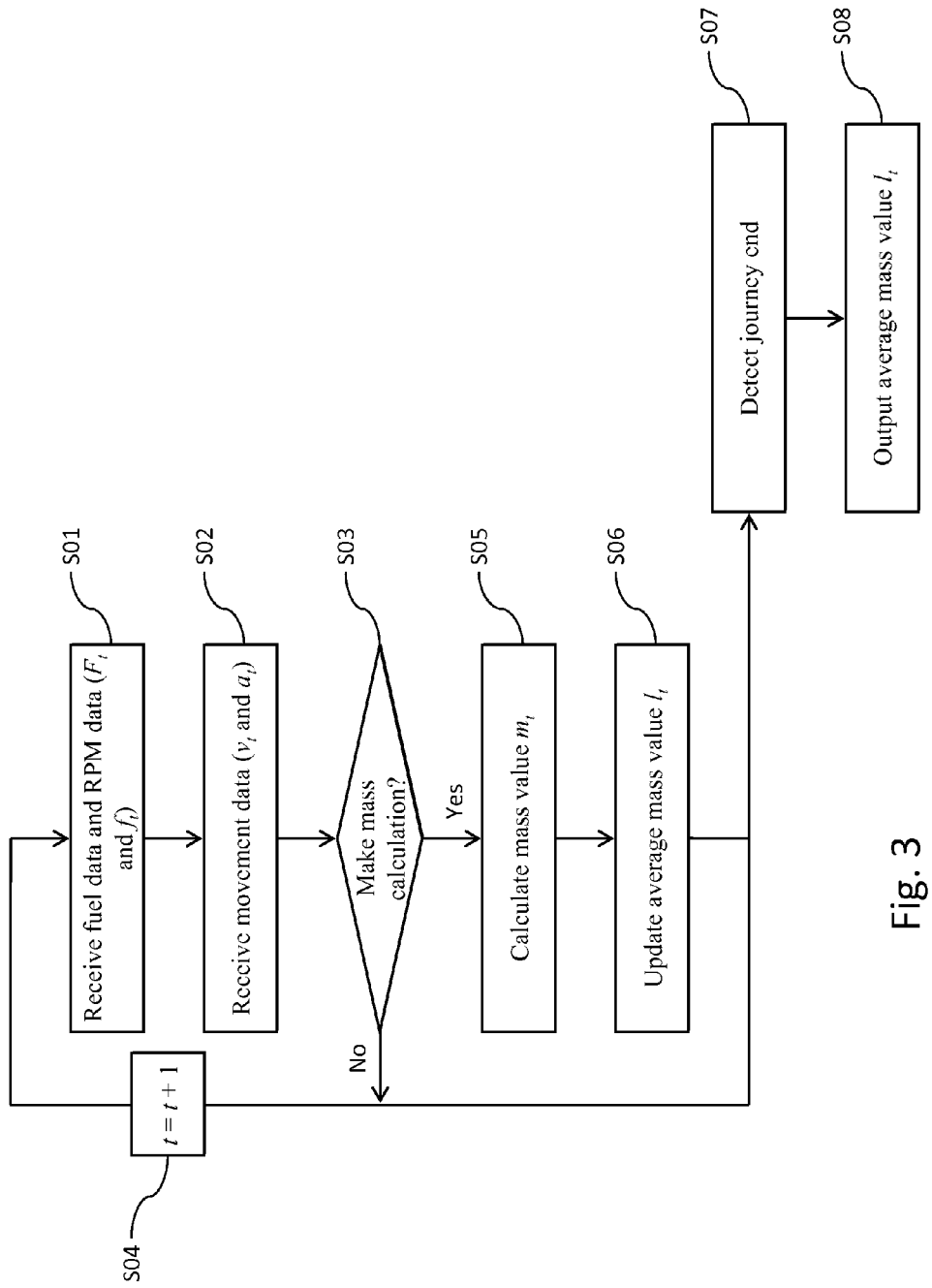
FIG. 3 is a schematic flow diagram showing a method of identifying a mass of a vehicle according to embodiments of the present technology.

A computer implemented method by which the telematics unit 100 may calculate a mass of a vehicle will now be described with reference to FIGS. 3 and 4. As described above, the memory 124 of the telematics unit 100 stores telematics software components 125 which are retrieved from the memory 124 and executed by the processor 122 in accordance with known principles to cause the processor to execute this method. It will be assumed for the purposes of the description below that such initialization steps (i.e. retrieving the computer software components from the memory etc.) have already been performed.

In the method described below, a leaky integrator is used. As is known, a leaky integrator operates by taking a running average, and for every new data point that is received, calculating a new running average based on a weighted average of the old running average and the value of the new data point. The weighting is normally biased in favour of the running average by a fixed factor which may be in the range of 10 to 10,000 depending on the number of data points which are to be taken into account (i.e. the upper frequency bound of the smoothing).

Therefore, if each row provides a mass value $m_r$, and the running average at time t is given by $l_r$, then for each new data point, the new average is given as:

$$l_t = \alpha l_{t-1} (1-\alpha) m_t$$

where $\alpha$ is a leaking factor, normally selected to have a value in the range from 0.9 to 0.99999. The skilled person will understand that the leaking factor $\alpha$ may be selected to give optimum results based on, for example, the frequency at which data is provided to the telematics unit, the variation in the mass values $m_t$ provided, and the desired convergence time. In the present case, an effective value for α might be 0.99, 0.995, 0.999 or 0.9995, giving a convergence times ranging from about 20 minutes to 2 hours (assuming one data sample a second). It will therefore be apparent that as a part of the initialization steps the processor stores this average value $l_t$ in the memory 124.

The steps performed by the processor 122 in accordance with the programming instructions encoded within the telematics software components 125 will now be described with reference to FIG. 3. Steps S01 to S04 occur for each time point t. By contrast the steps S07 and S08 occur as required.

In a first step S01, the processor 122 receives data from the engine ECU indicating the fuel rate of the engine ($F_t$) and the rotational speed of the engine ($f_t$). This data is received via the OBD connector 110.

In step S02, the processor 122 also receives the movement data relating to the movement of the vehicle. This data includes the velocity data $v_t$ (received from any of the sources mentioned above) and acceleration data $a_t$ received from the accelerometer 126.

At step S03, the processor determines whether to perform a mass calculation using the received data, e.g. by executing a filtering algorithm to classify the point in time associated with the data so as to include/exclude certain points in time for a mass calculation. There are many criteria which may be used in the filtering algorithm however as an example, the processor may test the data corresponding to the given point in time against certain conditions, examples being whether the velocity ($v_t$) or the acceleration ($a_t$) are non-zero (since the calculation would then require a division by zero which would produce an error), or whether the vehicle is accelerating (since deceleration may indicate that the brakes are being applied, and therefore the closed system as described above is losing energy and Equation 2 is no longer valid).

If the filtering algorithm returns a result indicating that a mass value $m_t$ is not to be calculated then the processor awaits the next set of data (i.e. the data corresponding to the next time index). This is represented in FIG. 3 as a return to step S01 via step S04 in which the time index t is incremented. It will be understood that in some embodiments, the data is processed once data is received for a series of time points, therefore the processor 122 will not have to wait for additional data, but will begin to process the additional data as soon as step S01 is reached.

However, if the filtering algorithm indicates that a mass calculation is to be performed then, in step S05, the processor 122 calculates a mass value $m_t$ using the received data for that point in time. In so calculating $m_t$, the processor 122 may perform operations in accordance with Equation 2 above.

Having calculated the mass value $m_t$, as shown by step S06, the processor updates the average mass value $l_t$ stored in the memory 124. As described above, the methodology involves use of a leaky integrator. Consequently, to update the average mass value $l_t$, the processor may retrieve the value from memory 124, update it in accordance with the leaky integrator equation shown above and store the new value in the memory 124. Having updated the average mass value $l_t$ the processor will await new data, as described above schematically in step S04, and S01.

As described above, one object is to provide a value indicative of the mass of the load being carried by a vehicle. It will be apparent that this value may vary between journeys due to the vehicle being loaded and unloaded; however, this value will not change during the course of a journey (the total mass of the vehicle may change slightly during the course of a journey as fuel is consumed, but this change will be minor). Consequently, in step S07 the processor 122 is configured to detect the end of a journey. This may be done by detecting the ignition being switched off, or by using the GPS data or velocity data to detect a sustained period in which the vehicle is stationary.

At the end of a journey, the average mass value $l_t$ would be expected to have its most accurate value, since a maximum possible number of data values have been used in its generation (for this journey). Consequently, in step S08 the processor 122 may designate this average mass value $l_t$ in such a way that it is recorded as the mass value for the entire journey. This may involve transmitting the value to a server using the wireless connection through mobile communications antenna connector 106, or alternatively may involve storing the value in the memory 124 for later retrieval. As an alternative, the processor 122 may calculate a value for the mass of the load of the vehicle by subtracting a known value indicative of the unladen mass of the vehicle (the kerb weight) from the average mass value $l_t$ and output this load mass value instead.

Figure 4:
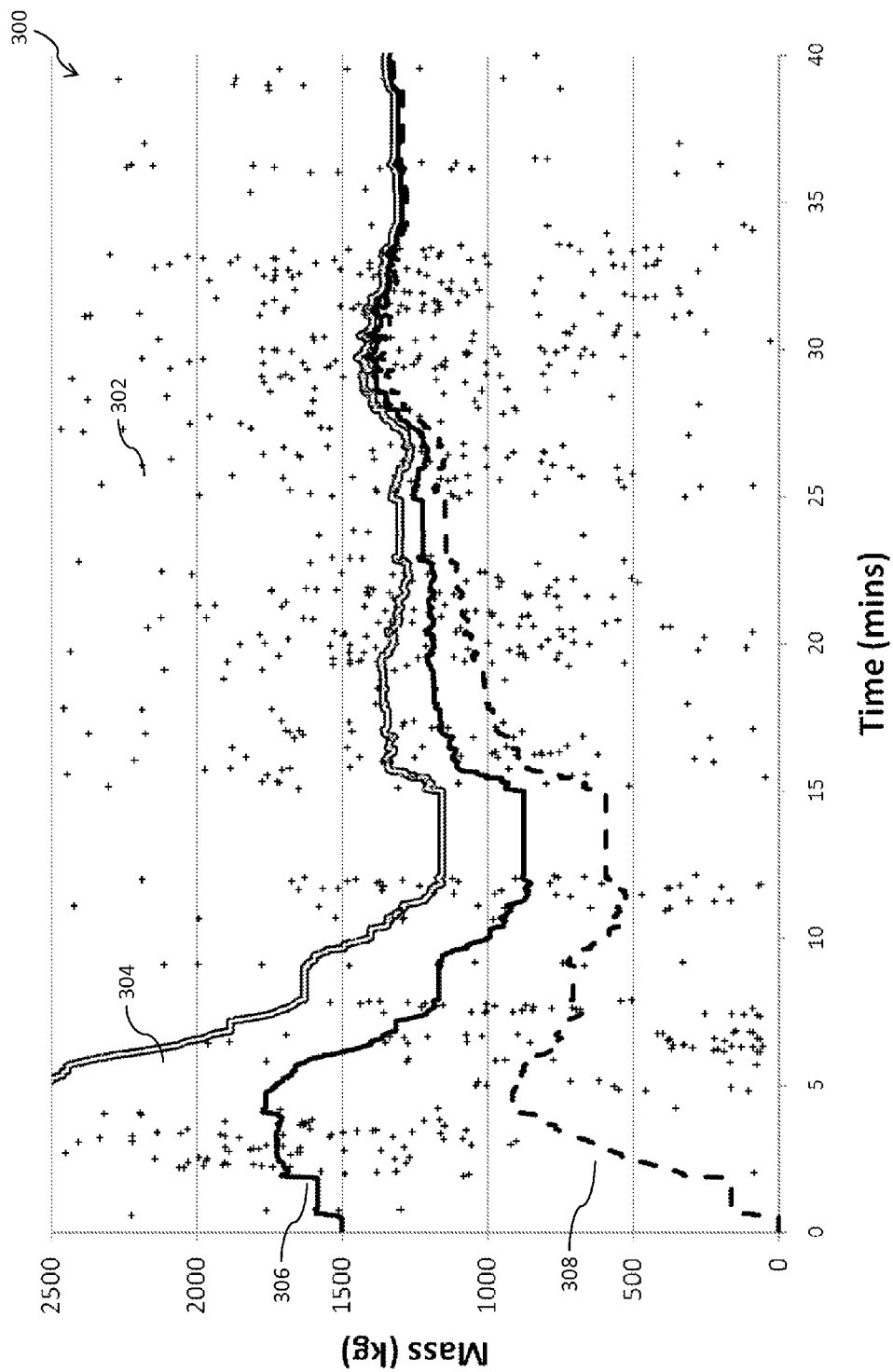
FIG. 4 is a plot showing a series of mass values and the evolution of an average mass value against time.

FIG. 4 shows a plot 300 of the same recorded data that was described in connection with FIG. 2 above. The vertical axis represents mass (in kg), while the horizontal axis represents time (in minutes). In the plot 300, the small crosses 302 represent individual values for the calculated mass ($m_t$). The three lines (twin lines) 304, (solid black line) 306 and 308 show average values ($l_t$) that might be stored in the memory 124, and show how these values might change as they are updated by the processor 122 as the processor performs the steps described above. Each line differs only in the initial value provided to the respective leaky integrator. The top curve, shown as twin lines 304, shows the value held the memory given an initial value of 3000 kg. The middle curve, shown as a solid black line 306, shows the value held in the memory given an initial value of 1500 kg. The bottom curve, shown as dashed line 308, shows the value held in the memory given an initial value of 0 kg. The leaking factor α used in each of these cases is 0.995. As can be seen, all three lines converge on a mass value of approximately 1400 kg.

It will be apparent that the selection of the initial value used by the leaky integrator is material, since it will affect the time taken before the average value arrives at a relatively stable value. Consequently, the memory 124 may be configured to store an initial value which is retrieved by the processor 122 at the beginning of a journey. This initial value may be specific to the vehicle, or may be a generic initial value. At the end of any given journey, the processor 122 may store the current average mass value in the memory, and retrieve this value to be used as the initial value for the next journey.

The selection of the leaking factor is also important. In the example shown, the three lines converge after approximately 30 minutes. Therefore, the leaking factor a used in the plot (0.995) would be expected to give an accurate results (irrespective of the initial value in) after 30 minutes. Nevertheless, it may be desirable to have a faster convergence time, in which case a value of, for example, 0.99 might be used. Alternatively, as can be seen from the plot, there is noticeable variation in the average values even after convergence. Consequently, a longer leaking factor α may be used, such as 0.999, or 0.9995. While this will have a greater smoothing effect on the data, it will also lengthen the time to convergence. It will be apparent that trial and error may be used to select the most appropriate leaking factor for any given circumstances. Equally, the leaking factor may be varied from case to case, for example so that a greater degree of smoothing is performed on longer journeys.

In some embodiments a combination of high and low levels of smoothing may be used to give fast convergence, followed by a longer period in which the value is refined. For example, for the first 30 minutes, a leaking factor of 0.995 may be used (which as described above gives convergence). After this, the leaking factor may be changed to 0.999. Other combined options will be apparent to the skilled person.

There are many uses for the value indicative of the mass of the vehicle as a whole, and for a value indicative of the mass of the load of a vehicle. Some examples are described above. Therefore, in embodiments, the mass value may be put to use in one or more of these contexts. Other uses will be apparent to the skilled person without departing from the scope of embodiments.

Additional Details and Modifications

It will be noted that the factor $A_R$ contains a component for mass, however the mass value does not appear as a variable in this portion of Equation 1 As such, $A_R$ may be a constant provided to the system along with the other factors. Alternatively, in some embodiments, the processor may calculate the factor $A_R$ from the currently stored average mass value. As such, the factor $A_R$ may be derived at each time point t, from $l_{t-1}$. Alternatively, the processor may periodically update the factor $A_R$ using the current mass value at the time of update.

As a further alternative, a new rolling resistance factor ($A_R$) may be calculated such that $A'_R = C_{rr} g$. Consequently Equation 1 becomes:

$$A_F F_t = m a_t v_t + A_D v_t^3 + A'_R m_t v_t + A_E f_t \quad \text{(Equation 1a)}$$

and Equation 2 becomes:

$$m_t = (A_F F_t - A_D v_t^3 - A_E f_t)/v_t(a_t + A'_R) \quad \text{(Equation 2a)}$$

It will be understood that Equation 2a may be used as the basis for the mass calculations performed in step S05 by the processor 122 in alternative embodiments.

While the above examples have been concerned with deriving the mass of a vehicle from fuel consumption, velocity, acceleration and RPM data, it is equally possible to derive other factors and/or variables using Equation 1 and its derivatives. In certain cases, the mass of the vehicle must be estimated so that the other factors may be calculated.

For example, in some cases, data relating to fuel consumption is not available to a telematics unit, for example because the telematics unit is not connected to the vehicle network (i.e. via the OBD connector 110), and therefore is unable to receive fuel data from the engine ECU. In such situations the telematics unit 100 may still be able to determine acceleration from an accelerometer 126 and velocity from the GPS circuitry 114. The telematics unit may also have a connection (not shown in FIGS. 1A or 1B) to the vehicle DC supply (e.g. the 'cigarette lighter' socket) for powering the telematics unit 100. The telematics unit 100 may measure the ripple (i.e. variation) in this power supply so as to determine the rotational speed of the engine of the vehicle. This is possible when vehicles use alternators to provide the DC power: in such vehicles, despite being smoothed, the DC voltage provided by the vehicle will contain a ripple corresponding in frequency to the rotational speed of the alternator and thus the engine.

Equation 1 may therefore be adapted to give an equation for the energy/power changes in the system due to the engine burning fuel and from the vehicle braking (collectively $P_t$). This equation is shown in Equation 3.

$$P_t = m a_t v_t + A_D v_t^3 + A_R v_t + A_E f_t \quad \text{(Equation 3)}$$

It will be apparent that the processor will have to be provided with a value for the mass of the vehicle (m in the equation above), along with the factors $A_F$, $A_D$, $A_R$ and $A_E$ so as to be able to calculate $P_t$ using Equation 3.

Using $P_t$, the processor may calculate the fuel consumption of the vehicle. The fuel consumption (given as $F_t$) may be calculated from $P_t$ using Equation 4:

$$F_t = \begin{cases} P_t/A_F & P_t > \gamma \\ \gamma & P_t \le \gamma \end{cases} \quad \text{(Equation 4)}$$

where $\gamma$ represents a minimum instantaneous fuel consumption of the engine and $A_F$ is an energy conversion factor as described above. This minimum instantaneous fuel consumption may indicate the fuel consumption when the engine is idling, or alternatively may represent the fuel that is consumed in the engine when the vehicle is braking. In some embodiments, $\gamma$ may take the value of zero, alternatively, the skilled person may derive a value for $\gamma$ experimentally.

The processor 122 may sum the fuel consumption (multiplied as required by the sampling period) over a journey to derive an estimate of the total fuel consumed in a particular journey. This has a number of uses: for example, an estimate of the fuel levels in a vehicle could be transmitted to a controlling station (using e.g. mobile communications circuitry 116). This will enable the controlling station to plan a fuel stop as required in a route schedule, or for the controlling station to measure the fuel efficiency of the journey. As an alternative, the driver may be given up to the moment feedback on fuel consumption for the journey, for example by receiving an output vie the user interface connected to user interface connector 108 of the telematics unit 100. Other uses for an estimate of fuel consumption will be apparent to the skilled person.

Alternatively or additionally, the telematics unit may be arranged to determine a value indicative of wasted fuel or energy, this being the sum of the $P_t$ values where the values are less than $\gamma$ (i.e. $P_t < \gamma$), multiplied by the sampling period. It will be apparent that a negative $P_t$ value is indicative of energy leaving the vehicle 'system' (as defined above), which generally indicates use of the brakes. The processor may determine a value indicative of wasted fuel, this being calculated from $P_t/A_F$ when $P_t$ is negative.

By determining wasted fuel or energy, a telematics unit 100 (or a control system connected thereto) is able to generate an indication of harsh acceleration and braking, or more generally, bad driving. Such an indication may be used to educate drivers in efficient driving, and may equally be used to estimate the cost savings of providing the vehicle with a regenerative braking system.

In some embodiments, the telematics unit may be mounted in a hybrid vehicle. As such, each time point where $P_t$ is negative may be taken to be indicative of energy being stored in the regenerative braking systems of the vehicle. The telematics unit may therefore adjust the calculated fuel consumption of the vehicle based on this energy being subsequently output from the regenerative braking systems. This may be done by, for example, assuming that the regenerative braking system has a fixed efficiency (of e.g. 80%). Alternatively the telematics unit may determine the efficiency of the regenerative braking systems based on, for example, the harshness of the braking (since for harsh braking, the conventional brakes of the vehicle are likely to be used and therefore not all of the energy will be available to the regenerative braking system).

As mentioned above, it may be possible for the telematics unit 100 to determine or refine the factors s $A_F$, $A_D$, $A_R$ and $A_E$. As such the telematics software components 125 may encode instructions therein which, when executed, cause the processor to determine or refine these factors using an adaptation of Equation 1 and a series of values for acceleration ($a_t$), velocity ($v_t$), fuel consumption ($F_t$) and engine RPM ($f_t$).

For example, a value for $A_D$ may be calculated using Equation 5 in which the mass value has been replaced by the average mass value $l_r$:

$$A_D = A_F F_t - l_r a_t v_t - A_R v_t - A_E f_t / v_t^3 \quad \text{(Equation 5)}$$

The value $A_D$ may be stored in memory 124, and the processor may be configured to periodically update the value $A_D$. This updating may be performed using the principles of a leaky integrator as described above; that is the processor may calculate a value for $A_D$ using operations in accordance with Equation 5, and then retrieve, update and re-store the value for $A_D$. In so doing, the processor 122 may be configured to analyse the received data to identify particular conditions which are appropriate for an accurate estimate of the value $A_D$. For example, the aerodynamic drag will be most accurately measured at high speed and when the vehicle is not accelerating (so that the aerodynamic drag is the largest power component in the system). Consequently, under such conditions the telematics unit may be configured to update the stored value for $A_D$, rather than the stored value for $l_r$. A similar process may be used for the other factors $A_F$, $A_R$ and $A_E$.

It was noted in the example above, and as can be seen from FIG. 4, there is significant variation in the mass values calculated by the processor 122. As such, the processor may be configured to perform a number of filtering operations on the received data to reduce this variation. For example, the processor may be arrange to smooth some or all of the data values ($f_t$, $F_t$, $v_t$ and $a_t$) before using them to calculate a mass value $m_r$. The filtering may be done using a leaky integrator, or simply by storing a number of values in memory 124 and calculating an average. Other methods of smoothing will be apparent to the skilled person.

In addition, the data may be received at differing rates, for example 10 accelerometer data values ($a_t$) may be received every second, while only one fuel rate data value ($F_t$) may be received every second. As such, the processor 122 may be arranged to average some of the values, so that the data values are provided at the same rate.

As described above with reference to FIG. 3, step S03 involves filtering the points in time to determine a subset of the data for which a mass calculation is possible or useful. In addition to the examples described above, the following additional criteria may be used by the processor 122 to determine invalid time points:

a. the speed of the vehicle is above a threshold (since at low speeds there are likely to be large errors due, for example, to the clutch being slipped);
b. the speed of the vehicle is below a threshold (since at high speed a small error in the value of the aerodynamic drag factor $A_D$ may lead to a large error in the mass value);
c. the acceleration of the vehicle is below a threshold (since the engine is likely to be substantially less efficient in high acceleration situations as compared to low acceleration situations, and therefore the fuel value may be disproportionally high);
d. the acceleration of the vehicle is below a threshold (indicating braking as mentioned above);
e. the vehicle is not changing gears (this can be determined from information received directly from the gear box, or from a comparison of the engine RPM against the vehicle velocity—when the vehicle is changing gears the engine is not connected to the wheels, and therefore the closed system described above does not apply);
f. the rotational speed of the engine is below a threshold (since the efficiency of the engine is likely to sharply decrease at the top end of its working range); and
g. the rotational speed of the engine is above a threshold (since the efficiency of the engine is likely to be low if the engine is struggling as may occur when under heavy load at a low speed of rotation).

Other criteria may be used as will be apparent to the skilled person. The effect of selecting a subset of the time points is to ensure that the closed system equations above (Equations 1 and 2) are valid, and that any errors or potential errors are minimized. It will be understood that the skilled person may use trial an error to determine the best conditions for an effective estimation of a mass value.

As mentioned above, there may be differing lags in the system. Consequently, the processor 122 may be programmed to introduce a lag to one or more of the sets of data values so that the correspondence between values is improved. The processor 122 may measure these lags by, for example, identifying peaks and troughs in the data which should align, and calculating the temporal difference between the peaks. As an example, fuel rate and acceleration should peak at the same time, and therefore the time at which values for these parameters peak can be compared and a lag calculated therefrom. Alternatively, the memory 124 may store preconfigured lag values, which are retrieved and used by the processor in a similar manner to the factors described above.

In the example above, one average mass value $l_r$ is calculated. However to improve the accuracy, and to reduce the effects of errors in the factors ($A_F$, $A_D$, $A_R$ and $A_E$), the processor 122 may store, in memory 124, a plurality of average values each associated with certain conditions (such as the acceleration of the vehicle being in a certain range, where each stored value is associated with one of a series of ranges). The processor may, having calculated a mass value $m_r$, select one of the plurality of average values based on the acceleration associated with that point in time being within the range associated with the selected average value and update that average value accordingly. As a result, a series of average values may be generated, and subsequently processed by the processor to determine a final mass value.

As an example, the processor 122 may determine a value for force (which equals $m_t a_t$) in a similar manner to the mass values described above, i.e. from a rearranged version of Equation 1:

$$m_t a_t = (A_F F_t - A_D v_t^3 - A_R v_t - A_E f_t) / v_t \quad \text{(Equation 6)}$$

For each point in time for which there is valid data (see step S03 discussed above), the processor calculates the force ($m_t a_t$) using Equation 6. Each result is then assigned to a range or 'bucket' based on the acceleration at that point in time and used to update an associated average value.

Theoretically, the force ($m_t a_t$) and the acceleration ($a_t$) will have a linear association. Therefore the processor may subsequently be programmed to perform a regression analysis on this data to determine the linear association, and thus the mass of the vehicle.

Figure 5:
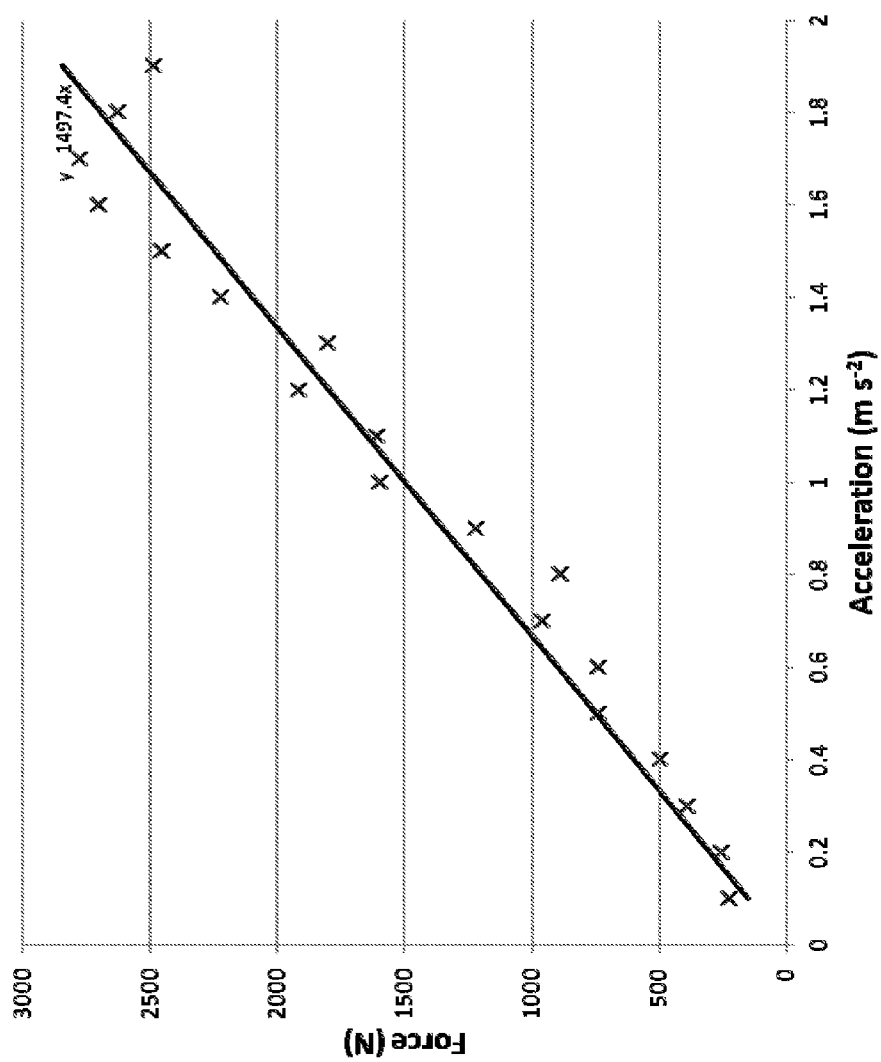
FIG. 5 is a plot of acceleration against force as calculated in alternative embodiments of the present technology.

FIG. 5 shows data calculated in accordance with the above methodology. Each range or bucket is of width $0.1 \text{ ms}^{-2}$, and the ranges extend from 0.05 to $2.05 \text{ ms}^{-2}$ (i.e. if the acceleration for a point in time is $0.521 \text{ m s}^{-2}$ then the force value would be assigned to the range corresponding to the range of $0.45\text{-}0.55 \text{ ms}^{-2}$). For each range an average of the force values is plotted. The line of best fit is also shown on the graph, in this case having a gradient of 1497, indicating that this is the mass of the vehicle in kilograms.

Similar analysis can be performed by the processor using, for example, ranges/buckets corresponding to velocity, acceleration and/or the gear the vehicle is in.

It was mentioned above that one or more of the factors ($A_F$, $A_D$, $A_R$ and $A_E$) may not be constant, and may be calculated from other factors. As examples, the processor may calculate the aerodynamic drag factor $A_D$ at each time point (or may periodically update the value), based on received data indicative of the ambient air temperature or humidity (which has an effect on the mass density of the air $\rho$ from which $A_D$ is calculated). Data indicative of the air temperature of humidity may be detected by vehicle sensors and provided to the processor 122 via the (OBD) driver circuitry 120.

In addition, a more complex energy conversion factor $A_F$ may be used. Factors which may affect $A_F$ include, but are not limited to: the rotational speed of the engine (since at high or low RPM, the engine efficiency may significantly decrease); the rate at which fuel is being provided to the engine or equivalently the amount of fuel provided to the engine per revolution (since the fuel air ratio in a cylinder of the engine will affect the efficiency of the engine; and the total load on the engine (since under light or particularly heavy loads the efficiency of the engine may decrease).

It will be understood that a function of some or all of the above factors may be used to derive $A_F$, and that the skilled person would be able to derive appropriate values using trial and error. Thus the processor may be configured to calculate this energy conversion factor using received data indicative of one or more of the above and an appropriate function.

In some cases, the coefficient of aerodynamic drag of the vehicle ($C_D$) and consequently $A_D$ may not be known (for example, the vehicle manufacturer may not provide such values). Consequently, $C_D$ and/or $A_D$ may be calculated from the vehicles stated top speed, kerb weight and engine power using the equation:

$$A_D = (P_{max} - C_{rr} m g v_{max} - A_E f_{max})/v_{max}^3 \qquad \text{(Equation 7)}$$

where $v_{max}$ is the top speed of the vehicle, $P_{max}$ is the maximum engine power and $f_{max}$ is the rotational speed of the engine when developing maximum power. Estimates of $C_{rr}$, m and $A_E$ (as described above) are also used. It will be apparent that the maximum power of the engine is substantially greater than the losses in the engine ($A_E f_{max}$) therefore this term may be excluded.

In the above examples, the engine RPM was included in the calculations, however in some embodiments the term $A_E f_t$ may be excluded. This may either be for simplicity or because the RPM is not available to the telematics unit. As an alternative, a fixed value may be substituted in place of the variable term $A_E F_t$.

In the embodiment described above, step S07 involves the processor 122 detecting the end of a journey as a trigger condition for outputting the average mass value $l_t$. However, any trigger event may be used: for example, the processor 122 may periodically output the current average mass value $l_t$. Alternatively a controlling station connected to the telematics unit 100 via mobile communications circuitry 116 may request the current mass value $l_t$ and the telematics unit may then send the mass value $l_t$ in response to receiving the request.

In many of the examples above, the processes and calculations have been described as being performed in the processor 122, in accordance with software components stored in memory 124. However it will be apparent that any known alternatives are envisaged. For example, the processor may be a dedicated processor such as an ASIC (application specific integrated circuit), an FPGA (field programmable gate array), or the like, that is the processor may be specifically configured hardware for conducting the operations described above. Alternatively, some or all of the calculations may be performed by the controlling station on receipt of the appropriate data. The controlling station may therefore be provided with its own memory and processor to perform such functions.

In the examples above, the data has been identified using the time index t. However it will be readily realized that this index is for clarity of the method described above and the index does not need to be stored or referenced by the telematics unit for embodiments to work. In other words, if leaky integrators are used to calculate the averages, then no historic values, except a running average for each integrator, need to be stored, therefore each of the calculations described above can be considered to use the current values of any particular variable (which will be the only ones available), rather than retrieving particular values based on the current index value.

The above embodiments have been described as using a leaky integrator with a specified leaking factor. It will be understood that this is purely exemplary and that any other form of filtering or averaging may be used. The filters may be provided by dedicated hardware, or may be provided in software or a combination of the two. The filters may use the memory to store one or more historic values (such as the running average in the case of a leaky integrator), or may be provided with their own dedicated memory.

The period over which the data is averaged may be varied to suit circumstances. The choice of leaking factor may be made based on the circumstances, but in general needs to be low enough that the average mass value $l_t$ converges on the actual mass value within the length of a journey, yet high enough so that the variation in the long term average value around the average is small. It will be apparent that the skilled person would be able to determine a suitable value using trial and error.

The above embodiments have been described in which the data defining the vehicle's speed is received via an OBD connector. The OBD standard is used by most car manufacturers, therefore this provides a convenient method for receiving speedometer data from a vehicle. Nevertheless, other methods, including using proprietary sensors, or another form of communication with the ECUs within the vehicle, may be used to determine the speed of the vehicle. Equally, any particular OBD related standard, for example European-OBD (EOBD) and Japanese-OBD (JOBD) may be used. In such alternative embodiments, the OBD connector 110 and driver circuitry 120 may be replaced by suitable alternative connectors/circuitry.

Equally, while the data received through the OBD port has been described as being provided by one or more of the engine ECU 130, gearbox ECU 132 and ABS ECU 134, the data may be received from any ECU or device connected to the vehicle network. All the data may be received from a single ECU, or different types of data may be received from different ECUs (i.e. the RPM data from the engine ECU 130 and the velocity data from the gearbox ECU 132). The signalling required to retrieve the data is well known to the skilled person.

The accelerometer has been described as being mounted internally to the telematics unit. However this may not be the case and the accelerometer may be provide as an external module to the telematics unit, to be connected to the telematics unit using a cable or a short range wireless link.

The telematics unit has been described above with a number of specified features, however it will be realized that many of the features are optional; in particular, in some embodiments, one or more of: the GPS unit and circuitry (104 and 114); the mobile communications unit and connector (106 and 116); the (user interface) driver circuitry and connector (118 and 108); (OBD) driver circuitry and connector (120 and 110); and accelerometer 126 may be excluded.

In addition, it will be realized that while the telematics unit 100 has been described simply with a processor 122 and memory 124 for determining and storing the mass value (and any other values as required), any appropriate hardware may be used. This may include providing dedicated hardware arranged to perform one or more of the steps described above.

The memory may be volatile or non-volatile or a combination of the two. If present, the non-volatile memory may be a flash, EPROM or disk based memory. The memory may store the average mass value. In addition, the memory may store historic values of any or all data received by the system. These values would be stored in case of a loss of power (for example if the ignition of the vehicle is switched off, or if the battery of the vehicle fails) and therefore would be available to the telematics unit when the power returns.

In the above embodiments, braking has been determined based on deceleration of the vehicle. However, additional data may be received and used by the telematics unit. For example the ABS ECU may transmit data on the in vehicle network when the brakes of the vehicle are applied. This data may be provided through the driver circuitry 120 to enable the telematics unit to directly determine braking.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope, which is defined in the accompanying claims. The features of the claims may be combined in combinations other than those specified in the claims.

The invention claimed is:

1. A system for calculating a first mass value indicative of a first mass of a vehicle, said vehicle having a vehicle interface capable of providing fuel data indicative of a rate at which fuel is being consumed by an engine of said vehicle at each point in time of a plurality of points in time, said system comprising:
   an interface coupled with said vehicle interface, said interface configured for:
      receiving said fuel data, wherein said fuel data comprises:
         a measured fuel rate of said engine measured at said each point in time; and
         a measured rotational speed of said engine measured at said each point in time; and
      receiving movement data indicative of a movement of said vehicle at said each point in time; and
   a data processing system configured for:
   deriving a plurality of mass values from said fuel data and said movement data, each mass value of said plurality of mass values corresponding to a respective point in time of said plurality of points in time; and
      calculating, using said plurality of mass values, said first mass value indicative of said first mass of said vehicle.

2. The system of claim 1, wherein said data processing system is further configured for:
   retrieving said first mass value indicative of said mass of said vehicle when said vehicle is unloaded; and
   calculating a second mass value indicative of a second mass of a load being carried by said vehicle by subtracting said first mass value indicative of said first mass of said vehicle when said vehicle is unloaded from a third mass value indicative of a third mass of said vehicle with said load.

3. The system of claim 1, wherein said data processing system is further configured for:
   identifying, using said fuel data and said movement data, a subset of said fuel data and said movement data; and
   calculating said first mass value indicative of said first mass of said vehicle using said plurality of mass values which correspond to said subset of said fuel data and said movement data.

4. The system of claim 3, wherein said data processing system is further configured for:
   identifying said subset of said fuel data and said movement data to include points in time of said plurality of points in time other than those corresponding to at least one of the following:
      a vehicle changing gear;
      an acceleration of said vehicle being above a threshold;
      an acceleration of said vehicle being below a threshold;
      a velocity of said vehicle being above a threshold;
      a velocity of said vehicle being below a threshold;
      a rotational speed of said engine being above a threshold; and
      a rotational speed of said engine being below a threshold.

5. The system of claim 1, wherein at least some of said movement data is received from said vehicle interface.

6. The system of claim 1, wherein said interface is further configured for:
   being coupled with a GPS unit; and
   receiving at least some of said movement data from said GPS unit.

7. The system of claim 1, wherein said movement data comprises velocity data indicative of a velocity of said vehicle, said data processing system being further configured for:
   calculating acceleration data indicative of an acceleration of said vehicle using said velocity data.

8. The system of claim 7, wherein said data processing system is, for said each point in time, further configured for:
   calculating a first power value indicative of a first power produced by said engine using said fuel data;
   calculating, using said velocity data, a second power value indicative of a second power required to overcome resistance to said movement of said vehicle;
   calculating a change in energy value indicative of a change in energy of said vehicle by subtracting said second power value from said first power value; and
   deriving said first mass value corresponding to said each point in time using said change in energy value, said velocity data and said acceleration data.

9. The system of claim 8, wherein said data processing system is configured for:
   deriving at least one of the following to calculate said second power value:
      a drag value indicative of a power required to overcome aerodynamic drag of said vehicle; and
      a rolling resistance value indicative of a power required to overcome a rolling resistance of said vehicle.

10. The system of claim 9, wherein said interface is further configured for:
   receiving speed of rotation data indicative of a speed of rotation of said engine of said vehicle, said data processing system being configured for:
      deriving, using said speed of rotation data indicative of said speed of rotation of said engine, an engine loss value indicative of a power loss within said engine, said power loss value usable to calculate said second power value.

11. The system of claim 10, wherein said data processing system is further configured for:
deriving, from said fuel data, a fuel rate value indicative of said rate at which said fuel is being consumed by said engine; and
multiplying said fuel rate value by an energy conversion value indicative of an efficiency of energy conversion from said fuel to a rotational power in said engine, thereby calculating said first power value.

12. The system of claim 11, wherein said data processing system is further configured for:
calculating said energy conversion value using at least one of:
a speed of rotation of said engine;
a magnitude of said second power value;
said velocity data;
said acceleration data; said fuel data; and
one or more predetermined constants.

13. The system of claim 8, wherein said interface further is configured for:
receiving speed of rotation data indicative of a speed of rotation of said engine of said vehicle, said data processing system being configured for:
deriving, using said speed of rotation data indicative of said speed of rotation of said engine, an engine loss value indicative of a power loss within said engine, whereby to calculate the second power value.

14. The system of claim 13, wherein said data processing system is further configured for:
deriving, from said fuel data, a fuel rate value indicative of said rate at which said fuel is being consumed by said engine; and
multiplying said fuel rate value by an energy conversion value indicative of an efficiency of energy conversion from said fuel to a rotational power in said engine, thereby calculating said first power value.

15. The system of claim 14, wherein said data processing system is further configured for:
calculating said energy conversion value using at least one of:
a speed of rotation of said engine;
a magnitude of said second power value;
said velocity data; said acceleration data;
said fuel data;
and one or more predetermined constants.

16. The system of claim 8, wherein said data processing system is further configured for:
deriving, from said fuel data, a fuel rate value indicative of said rate at which said fuel is being consumed by said engine; and
multiplying said fuel rate value by an energy conversion value indicative of an efficiency of energy conversion from said fuel to a rotational power in said engine, thereby calculating said first power value.

17. The system of claim 16, wherein said data processing system is further configured for:
calculating said energy conversion value using at least one of:
a speed of rotation of said engine;
a magnitude of said second power value;
said velocity data;
said acceleration data;
said fuel data; and
one or more predetermined constants.

18. The system of claim 1, wherein said movement data comprises:
velocity data indicative of a velocity of said vehicle and acceleration data indicative of an acceleration of said vehicle.

19. The system of claim 18, wherein said interface is further configured for:
being coupled with an accelerometer mounted to said vehicle, and
receiving said acceleration data from said accelerometer.

20. The system of claim 18, wherein said data processing system is, for said each point in time, further configured for:
calculating a first power value indicative of a first power produced by said engine using said fuel data;
calculating, using said velocity data, a second power value indicative of a second power required to overcome resistance to said movement of said vehicle;
calculating a change in energy value indicative of a change in energy of said vehicle by subtracting said second power value from said first power value; and
deriving said first mass value corresponding to said each point in time using said change in energy value, said velocity data and said acceleration data.

21. The system of claim 20, wherein said data processing system is configured for:
deriving at least one of the following:
a drag value indicative of a drag power required to overcome aerodynamic drag of said vehicle; and
a rolling resistance value indicative of a rolling resistance power required to overcome a rolling resistance of said vehicle.

22. The system of claim 21, wherein said interface is further configured for:
receiving speed of rotation data indicative of a speed of rotation of said engine of said vehicle, said data processing system being configured for:
deriving, using said speed of rotation data indicative of said speed of rotation of said engine, an engine loss value indicative of a power loss within said engine, whereby to calculate the second power value.

23. The system of claim 22, wherein said data processing system is further configured for:
deriving, from said fuel data, a fuel rate value indicative of said rate at which said fuel is being consumed by said engine; and
multiplying said fuel rate value by an energy conversion value indicative of an efficiency of energy conversion from said fuel to a rotational power in said engine, thereby calculating said first power value.

24. The system of claim 23, wherein said data processing system is further configured for:
calculating said energy conversion value using at least one of:
a speed of rotation of said engine;
a magnitude of said second power value;
said velocity data; said acceleration data;
said fuel data; and
one or more predetermined constants.

25. The system of claim 20, wherein said interface is further configured for:
receiving speed of rotation data indicative of a speed of rotation of said engine of said vehicle, said data processing system being configured for:
deriving, using said speed of rotation data indicative of said speed of rotation of said engine, an engine loss value indicative of a power loss within said engine, whereby to calculate said second power value.

26. The system of claim 25, wherein said data processing system is further configured for:
  deriving, from said fuel data, a fuel rate value indicative of said rate at which said fuel is being consumed by said engine; and
  multiplying said fuel rate value by an energy conversion value indicative of an efficiency of energy conversion from said fuel to a rotational power in said engine, thereby calculating said first power value.

27. The system of claim 26, wherein said data processing system is further configured for:
  calculating said energy conversion value using at least one of:
    a speed of rotation of said engine;
    a magnitude of said second power value;
    said velocity data;
    said acceleration data;
    said fuel data; and
    one or more predetermined constants.

28. The system of claim 20, wherein said data processing system is further configured for:
  deriving a fuel rate value indicative of said rate at which said fuel is being consumed by said engine from said fuel data; and
  multiplying said fuel rate value by an energy conversion value indicative of an efficiency of energy conversion from said fuel to a rotational power in said engine, thereby calculating said first power value.

29. The system of claim 28, wherein said data processing system is further configured for:
  calculating said energy conversion value using at least one of:
    a speed of rotation of said engine;
    a magnitude of said second power value;
    said velocity data;
    said acceleration data;
    said fuel data; and
    one or more predetermined constants.

30. The system of claim 1, wherein said system further comprises:
  a memory, and said data processing system is further configured for:
  retrieving one or more predetermined constants from said memory, said one or more predetermined constants configured for deriving said first mass value.

31. The system of claim 30, wherein said one or more predetermined constants are selected based on characteristics of said vehicle.

32. A method for calculating a value indicative of a mass of a vehicle, said vehicle having a vehicle interface capable of providing fuel data indicative of a rate at which fuel is being consumed by an engine of said vehicle at each point in time of a plurality of points in time, said method comprising:
  receiving said fuel data from said vehicle interface, wherein said fuel data comprises:
    a measured fuel rate of said engine measured at said each point in time; and
    a measured rotational speed of said engine measured at said each point in time;
  receiving movement data indicative of a movement of said vehicle at said each point in time;
  deriving a plurality of mass values from said fuel data and said movement data, each mass value of said plurality of mass values corresponding to a respective said point in time of said plurality of points in time; and
  calculating, using said plurality of mass values, a mass value indicative of a mass of said vehicle.

33. A non-transitory computer readable storage medium storing computer readable instructions thereon for execution on a computing system to implement a method for calculating a value indicative of a mass of a vehicle, said vehicle having a vehicle interface capable of providing fuel data indicative of a rate at which fuel is being consumed by an engine of said vehicle at each point in time of a plurality of points in time, the method comprising:
  receiving said fuel data from said vehicle interface, wherein said fuel data comprises:
    a measured fuel rate of said engine measured at said each point in time; and
    a measured rotational speed of said engine measured at said each point in time;
  receiving movement data indicative of a movement of said vehicle at said each point in time;
  deriving a plurality of mass values from said fuel data and said movement data, each mass value of said plurality of mass values corresponding to a respective said point in time of said plurality of points in time; and
  calculating, using said plurality of mass values, a mass value indicative of a mass of the vehicle.

34. A system for estimating a fuel consumption of an engine of a vehicle, said system comprising:
  an interface configured for:
    receiving movement data indicative of a movement of said vehicle at a plurality of points in time; wherein said movement data comprises:
      velocity data indicative of a velocity of said vehicle;
      acceleration data indicative of an acceleration of said vehicle; and
    fuel data, wherein said fuel data comprises:
      a measured fuel rate of said engine; and
      a measured rotational speed of said engine; and
  a data processing system, wherein said data processing system is, for each point in time of said plurality of points in time, configured for:
    deriving, using said fuel data, a first power value indicative of a first power produced by said engine;
    deriving, using said velocity data of said movement data, a second power value indicative of a second power required to overcome resistance to said movement of said vehicle;
    deriving a third power value indicative of a change in energy of said vehicle, wherein said deriving said third power value comprises:
      subtracting said second power value from said first power value;
    estimating a fuel consumption of said vehicle based on a plurality of first power values;
    deriving a mass value corresponding to a point in time using said third power value, said velocity data and said acceleration data; and
    deriving, using said speed of rotation data, an engine loss value indicative of a power loss within said engine.

35. The system of claim 34, wherein said interface is further configured for:
  receiving at least some of said movement data from a vehicle interface of said vehicle, wherein said interface is coupled with said vehicle interface of said vehicle.

36. The system of claim 34, wherein said interface is further configured for:
  being coupled with a GPS unit; and
  receiving at least some of said movement data from said GPS unit.

37. The system of claim 34, wherein said interface is further configured for:
  receiving said acceleration data from an accelerometer, wherein said accelerometer is coupled with said vehicle and said interface.

38. The system claim 34, wherein said data processing system is further configured for deriving:
- a drag value indicative of a power required to overcome aerodynamic drag of said vehicle; and
- a rolling resistance value indicative of a power required to overcome rolling resistance of said vehicle, whereby said first power value is capable of being calculated based on said deriving.

39. The system of claim 34, wherein said data processing system is further configured for:
- estimating said fuel consumption using an energy conversion value indicative of an efficiency of energy conversion from fuel to a rotational power in said engine.

40. The system of claim 39, wherein said data processing system is further configured for calculating said energy conversion value using at least one of:
- said movement data;
- a speed of rotation of said engine;
- a magnitude of said second power value;
- a magnitude of said change in energy value; and
- one or more predetermined constants.

41. The system of any of claim 34, wherein said system further comprises:
- a memory, wherein said data processing system is further configured for:
  - retrieving one or more predetermined constants from said memory, whereby, estimating said fuel consumption is enabled based on said retrieving.

42. The system of claim 41, wherein said one or more predetermined constants are selected based on characteristics of said vehicle.

* * * * *